United States Patent
Akebono et al.

(10) Patent No.: US 8,437,933 B2
(45) Date of Patent: May 7, 2013

(54) VEHICLE CONTROL APPARATUS AND VEHICLE CONTROL METHOD

(75) Inventors: Hiromichi Akebono, Machida (JP); Hideharu Yamamoto, Fujinomiya (JP); Kota Miura, Isehara (JP); Hisashi Saito, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/283,938

(22) Filed: Oct. 28, 2011

(65) Prior Publication Data

US 2012/0109438 A1 May 3, 2012

(30) Foreign Application Priority Data

Nov. 1, 2010 (JP) .................................. 2010-245718

(51) Int. Cl.
*G06F 19/00* (2011.01)

(52) U.S. Cl.
USPC ............ 701/68; 701/22; 701/58; 180/65.265; 180/65.7; 477/12; 477/176

(58) Field of Classification Search .................... 701/22, 701/58, 60, 61, 67, 68; 180/65.1, 65.21, 180/65.265, 65.285, 65.6, 65.7; 477/7, 8, 477/12, 70, 166, 174, 176
See application file for complete search history.

(56) References Cited

U.S. PATENT DOCUMENTS

| | | |
|---|---|---|
| 5,361,213 A | 11/1994 | Fujieda et al. |
| 5,697,479 A | 12/1997 | Kono et al. |
| 5,944,632 A | 8/1999 | Hara et al. |
| 6,033,342 A | 3/2000 | Steinel et al. |
| 6,110,072 A | 8/2000 | Harada et al. |
| 6,135,919 A | 10/2000 | Shimakura |
| 6,253,137 B1 | 6/2001 | Abo et al. |
| 6,527,672 B1 | 3/2003 | Henneken et al. |
| 6,565,473 B2 | 5/2003 | Endo et al. |
| 6,602,160 B2 | 8/2003 | Tsutsui |

(Continued)

FOREIGN PATENT DOCUMENTS

| | | |
|---|---|---|
| EP | 1 972 833 A2 | 9/2008 |
| JP | 2000-170888 A | 6/2000 |
| JP | 2010-077981 A | 4/2010 |
| JP | 2010-179860 A | 8/2010 |

OTHER PUBLICATIONS

U.S. Appl. No. 13/361,640, filed Jan. 30, 2012, Akebono et al.

(Continued)

*Primary Examiner* — Russell Frejd
(74) *Attorney, Agent, or Firm* — Foley & Lardner LLP

(57) ABSTRACT

A hybrid electric vehicle has a first mode in which slippage of a clutch between an electric motor and a driving wheel is allowed and controlled by rotational speed control of the electric motor and a second mode in which the slippage of the clutch is allowed and controlled by rotational speed control of an engine. When the vehicle is stationary in the first mode, a controller reduces a control setpoint of hydraulic pressure of the clutch from an initial point. The controller identifies a reference point of the control setpoint with which actual output torque of the electric motor is substantially constant with respect to the reduction of the control setpoint. Then, the controller increases the control setpoint to a precharge point, and reduces the control setpoint to a corrected point that is lower than or substantially equal to the initial point and higher than the reference point.

11 Claims, 10 Drawing Sheets

U.S. PATENT DOCUMENTS

| | | | |
|---|---|---|---|
| 6,769,502 B2 | 8/2004 | Nakamori et al. | |
| 7,226,383 B2 | 6/2007 | Namba | |
| 7,404,460 B2 | 7/2008 | Oshidari | |
| 7,465,250 B2 | 12/2008 | Tamai et al. | |
| 7,610,891 B2 * | 11/2009 | Seufert et al. | 123/179.25 |
| 7,828,096 B2 | 11/2010 | Hoher et al. | |
| 8,037,858 B2 * | 10/2011 | Seufert et al. | 123/179.25 |
| 8,108,115 B2 * | 1/2012 | Kobayashi et al. | 701/67 |
| 8,297,249 B2 * | 10/2012 | Seufert et al. | 123/179.3 |
| 2002/0107103 A1 | 8/2002 | Nakamori et al. | |
| 2004/0157704 A1 | 8/2004 | Stork et al. | |
| 2005/0102082 A1 | 5/2005 | Joe et al. | |
| 2005/0215393 A1 | 9/2005 | Shimoda | |
| 2005/0222735 A1 | 10/2005 | Usuki et al. | |
| 2007/0142142 A1 | 6/2007 | Yamaguchi et al. | |
| 2007/0204817 A1 | 9/2007 | Russell et al. | |
| 2008/0011529 A1 | 1/2008 | Hoher et al. | |
| 2008/0017427 A1 | 1/2008 | Nakanowatari | |
| 2008/0220937 A1 | 9/2008 | Nozaki et al. | |
| 2009/0112423 A1 | 4/2009 | Foster et al. | |
| 2010/0018808 A1 | 1/2010 | Gloge | |
| 2010/0204862 A1 | 8/2010 | Uejima et al. | |
| 2011/0256978 A1 * | 10/2011 | Falkenstein | 477/5 |
| 2011/0276207 A1 * | 11/2011 | Falkenstein | 701/22 |

OTHER PUBLICATIONS

U.S. Appl. No. 13/281,939, filed on Oct. 26, 2011, Nagashima et al.
U.S. Appl. No. 13/283,991, filed Oct. 28, 2011, Akebono et al.
U.S. Appl. No. 13/283,974, filed Oct. 28, 2011, Akebono et al.
U.S. Appl. No. 13/283,954, filed Oct. 28, 2011, Akebono et al.
U.S. Appl. No. 13/283,909, filed Oct. 28, 2011, Mochiyama et al.
U.S. Appl. No. 13/281,990, filed Oct. 26, 2011, Mochiyama et al.
H. Akebono, U.S. PTO Notice of Allowance, U.S. Appl. No. 13/283,974, dated Nov. 23, 2012, 13 pages.
S. Mochiyama, U.S. PTO Office Action, U.S. Appl. No. 13/281,990, dated Nov. 30, 2012, 10 pages.
H. Akebono, U.S. PTO Office Action, U.S. Appl. No. 13/283,991, dated Mar. 14, 2013, 10 pages.

* cited by examiner

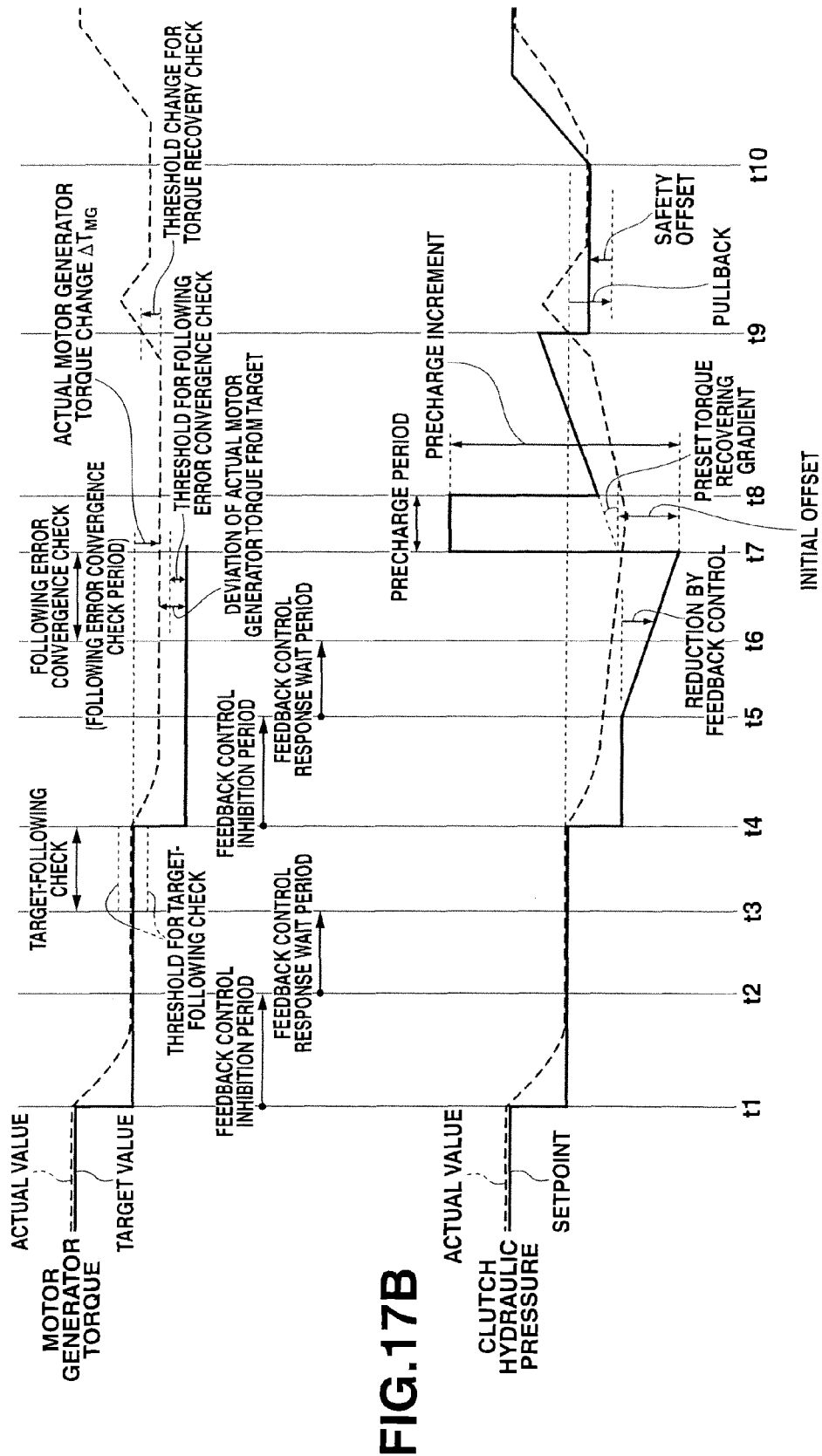

VEHICLE CONTROL APPARATUS AND VEHICLE CONTROL METHOD

BACKGROUND OF THE INVENTION

The present invention relates to vehicle control apparatuses and methods for controlling slippage of a coupling member connected between a driving source and a driving wheel in a motor vehicle.

Japanese Patent Application Publication No. 2010-077981 discloses a control apparatus for controlling an automatic transmission of a hybrid electric vehicle provided with an engine and an electric motor. This control apparatus is configured to implement a drive mode, which is referred to as "WSC drive mode", in which both of power of the engine and power of the electric motor are utilized to drive and start the vehicle while slippage of a clutch connected between the electric motor and a driving wheel of the vehicle is allowed.

SUMMARY OF THE INVENTION

The control apparatus disclosed by Japanese Patent Application Publication No. 2010-077981 may be confronted with a problem that with the WSC drive mode selected, a brake pedal is depressed to have the vehicle stationary, and allow continuous slippage of the clutch for a long period of time, and thereby overheat and deteriorate the clutch.

In view of the foregoing, it is desirable to provide a vehicle control apparatus or method for a vehicle provided with a driving source, a driving wheel, and a coupling member connected between the driving source and the driving wheel, wherein the vehicle control apparatus or method is capable of smoothly driving the vehicle in quick response to a driver's request while preventing the coupling member from being overheated and deteriorated due to slippage.

According to one aspect of the present invention, a vehicle control apparatus comprises: an engine configured to output a torque for driving a vehicle; an electric motor configured to output a torque for driving the vehicle; a clutch including an electric motor side element and a driving wheel side element, wherein the electric motor side element is connected to the electric motor and the driving wheel side element is connected to a driving wheel of the vehicle, wherein the clutch is configured to set according to hydraulic pressure a transmitted torque capacity for torque transmission between the electric motor side element and the driving wheel side element, and wherein the hydraulic pressure is regulated to a control setpoint; and a controller configured to set the control setpoint, wherein the controller is further configured to: implement an electric motor speed control drive mode by allowing slippage between the electric motor side element and the driving wheel side element of the clutch and controlling rotational speed of the electric motor in a manner that the electric motor side element of the clutch rotates faster by a controlled difference than the driving wheel side element of the clutch; implement an engine speed control drive mode by allowing the slippage of the clutch and controlling rotational speed of the engine in a manner that the electric motor side element of the clutch rotates faster by a controlled difference than the driving wheel side element of the clutch; determine whether the vehicle is stationary; perform a procedure of reducing the control setpoint in response to determination that the vehicle is stationary when the slippage of the clutch is being allowed and controlled; permit the procedure when in the electric motor speed control drive mode; and inhibit the procedure when in the engine speed control drive mode.

According to another aspect of the present invention, a vehicle control method of controlling an object with a controller, wherein the object includes: an engine configured to output a torque for driving a vehicle; an electric motor configured to output a torque for driving the vehicle; and a clutch including an electric motor side element and a driving wheel side element, wherein the electric motor side element is connected to the electric motor and the driving wheel side element is connected to a driving wheel of the vehicle, wherein the clutch is configured to set according to hydraulic pressure a transmitted torque capacity for torque transmission between the electric motor side element and the driving wheel side element, and wherein the hydraulic pressure is regulated to a control setpoint, the vehicle control method comprises: implementing an electric motor speed control drive mode by allowing slippage between the electric motor side element and the driving wheel side element of the clutch and controlling rotational speed of the electric motor in a manner that the electric motor side element of the clutch rotates faster by a controlled difference than the driving wheel side element of the clutch; implementing an engine speed control drive mode by allowing the slippage of the clutch and controlling rotational speed of the engine in a manner that the electric motor side element of the clutch rotates faster by a controlled difference than the driving wheel side element of the clutch; determining whether the vehicle is stationary; performing a procedure of reducing the control setpoint in response to determination that the vehicle is stationary when the slippage of the clutch is being allowed and controlled; permitting the procedure when in the electric motor speed control drive mode; and inhibiting the procedure when in the engine speed control drive mode.

BRIEF DESCRIPTION OF THE DRAWINGS

FIGS. 17A and 17B are a time chart showing an example of how the control procedure is performed with time.

DETAILED DESCRIPTION OF THE INVENTION

Figure 1:
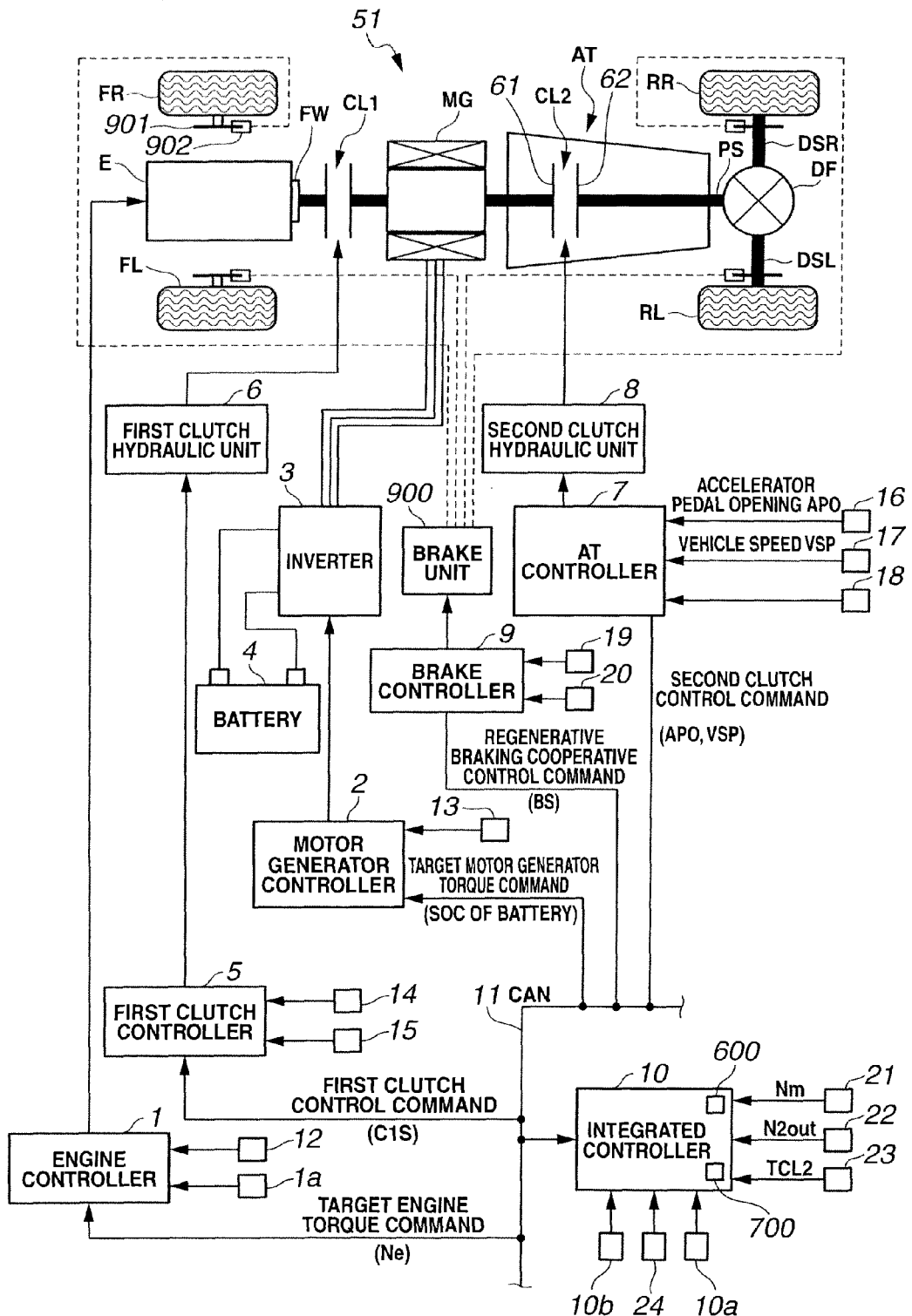
FIG. 1 is a schematic diagram showing system configuration of a rear wheel drive hybrid electric vehicle provided with a vehicle control apparatus according to an embodiment of the present invention.

FIG. 1 schematically shows system configuration of a front engine rear wheel drive hybrid electric vehicle provided with a vehicle control apparatus according to an embodiment of the present invention. First, the following describes mechanical configuration of a driveline of the hybrid electric vehicle. As shown in FIG. 1, the driveline of hybrid electric vehicle 51 includes an engine "E", a first clutch CL1, a motor generator "MG", a second clutch CL2, an automatic transmission "AT", a propeller shaft "PS", a differential gear "DF", a left drive shaft "DSL", a right drive shaft "DSR", a left front wheel "FL", a right front wheel "FR", a left rear wheel "RL", and a right rear wheel "RR". Left and right rear wheels RL, RR are driving wheels to which driving torque is inputted from engine E and motor generator MG, whereas left and right front wheels FL, FR are non-driving wheels to which no driving torque is inputted.

Engine E is a gasoline internal combustion engine in this example, which is controlled by an engine controller 1 so that throttle valve opening and others are controlled based on a control setpoint set by engine controller 1. Engine E includes an output shaft to which a flywheel "FW" is attached.

Automatic transmission AT is a five forward speed and one reverse speed automatic transmission in this example, which is configured to automatically shift the transmission gear ratio among a plurality of stepwise gear positions, depending on vehicle speed, accelerator opening and others. Automatic transmission AT has an output shaft that is coupled to left and right rear wheels RL, RR through propeller shaft PS, differential gear DF, left drive shaft DSL and right drive shaft DSR for driving the vehicle.

First clutch CL1 is arranged between engine E and motor generator MG, and is controlled by a first clutch controller 5 so that clutch hydraulic pressure is produced and controlled by a first clutch hydraulic unit 6 based on a control setpoint set by first clutch controller 5. First clutch CL1 is engaged and disengaged selectively according to the controlled clutch hydraulic pressure. Specifically, first clutch CL1 has a partly or incompletely engaged state between a completely engaged state and a completely disengaged state, which is referred to as "slip engaged state", in which slippage of a pair of engaging elements of first clutch CL1 is allowed.

Motor generator MG is a three-phase synchronous electric motor generator in which a permanent magnet is embedded in a rotor and a stator coil is wounded around a stator. Motor generator MG is controlled by a motor generator controller 2 so that three phase alternating currents are generated and applied to motor generator MG by an inverter 3 based on a control setpoint set by motor generator controller 2. Motor generator MG is configured to function as a motor based on power supply from a battery 4 (called "power running"), and function also as a generator to charge battery 4 by generating an electromotive force between ends of the stator coil when the rotor is rotated by an external force (called "regenerative running"). Motor generator MG is coupled to an input shaft of automatic transmission AT through a damper not shown.

Second clutch CL2 is arranged between motor generator MG and the set of left and right rear wheels RL, RR. Second clutch CL2 is controlled by an automatic transmission controller (AT controller) 7 so that clutch hydraulic pressure P2 is produced and controlled by a second clutch hydraulic unit 8 based on a control setpoint P2* set by AT controller 7. Second clutch CL2 is engaged and disengaged selectively according to the controlled clutch hydraulic pressure. Similar to first clutch CL1, second clutch CL2 has a slip engaged state between a completely engaged state and a completely disengaged state, in which slippage of a pair of engaging elements of second clutch CL2 is allowed. Second clutch CL2 is not specially provided, but constitutes automatic transmission AT. Namely, second clutch CL2 is composed of one or more of existing frictional coupling members of automatic transmission AT, each of which is engaged and disengaged selectively to establish the gear positions. Similarly, second clutch hydraulic unit 8 constitutes an automatic transmission hydraulic pressure control valve unit that is configured to control the engagement/disengagement of each coupling member under control of AT controller 7. Each clutch CL1, CL2 is implemented by a wet type multiplate clutch, wherein the flow rate and hydraulic pressure of working fluid supplied to clutch CL1, CL2 is controlled continuously by a proportional solenoid valve.

Hybrid electric vehicle 51 is provided with a brake unit 900. Brake unit 900 includes a fluid pump and a plurality of electromagnetic valves. Brake unit 900 is configured to implement a brake-by-wire control for producing a braking force in accordance with a braking force request from a brake controller 9 by generating hydraulic pressure by operation of the fluid pump, and controlling wheel cylinder pressures by selectively opening and closing the electromagnetic valves. Each wheel FL, FR, RL, RR is provided with a brake rotor 901 and a caliper 902 which are configured to generate frictional braking torque with brake hydraulic pressure supplied by brake unit 900. Brake unit 900 may be of a type provided with an accumulator or the like as a hydraulic source, or may be of a type provided with an electronic caliper for generating braking torque electronically not hydraulically.

The hybrid drive system described above is configured to implement first to third drive modes from which one drive mode is selected according to the state of engagement or disengagement of first clutch CL1. The first drive mode is an electric-motor-used drive mode or electric vehicle drive mode (henceforth referred to as "EV drive mode") in which first clutch CL1 is disengaged so that hybrid electric vehicle 51 is driven only by motor generator MG but not by engine E. The second drive mode is an engine-used drive mode or hydraulic electric vehicle drive mode (henceforth referred to as "HEV drive mode") in which first clutch CL1 is engaged so that hybrid electric vehicle 51 is driven not only by motor generator MG but also by engine E. The third drive mode is an engine-used clutch-slipping drive mode (henceforth referred to as "WSC drive mode") in which first clutch CL1 is engaged and second clutch CL2 is slip-controlled so that slippage of second clutch CL2 is allowed and controlled. The WSC drive mode allows hybrid electric vehicle 51 to creep especially when the state of charge (SOC) of battery 4 is low or when engine coolant temperature is low. Transition from the EV drive mode to HEV drive mode is implemented by engaging the first clutch CL1 and cranking and starting the engine E with the output torque of motor generator MG.

The HEV drive mode is composed of an engine drive mode, an electric motor assist drive mode, a driving generation mode, and a stationary generation mode. In the engine drive mode, only engine E is used to drive the driving wheels RL, RR. In the electric motor assist drive mode, both of engine E and motor generator MG are used to drive the driving wheels RL, RR. In the driving generation mode, engine E is used to drive the driving wheels RL, RR, and motor generator MG is used as a generator to generate electric energy. When hybrid electric vehicle 51 is traveling at constant speed or at accelerated speed, the output power of engine E is partly used to make the motor generator MG function as a generator in the driving generation mode. When hybrid electric vehicle 51 is decelerating, motor generator MG regenerates braking energy and charge battery 4 with regenerated energy in the driving generation mode. When hybrid electric vehicle 51 is stationary, the stationary generation mode is employed in which the output power of engine E is used to make motor generator MG function as a generator.

The following describes a control system of hybrid electric vehicle 51 with reference to FIG. 1. As shown in FIG. 1, the control system includes engine controller 1, motor generator controller 2, inverter 3, battery 4, first clutch controller 5, first clutch hydraulic unit 6, AT controller 7, second clutch hydraulic unit 8, brake controller 9, and an integrated controller 10. Engine controller 1, motor generator controller 2, first clutch controller 5, AT controller 7, brake controller 9, and integrated controller 10 are connected through a CAN communication line 11 for exchanging information with each other.

Engine controller 1 is configured to receive input of information about engine speed from an engine speed sensor 12 and other information from a sensor 1a, and input of an engine torque setpoint and others from integrated controller 10, and create based on the input information a control signal for controlling an engine operating point of engine E which is defined by engine speed Ne and engine torque Te, and output the control signal to a throttle valve actuator not shown and others. The information about engine speed Ne and others is provided to integrated controller 10 through CAN communication line 11.

Motor generator controller 2 is configured to receive input of information about rotor angular position of motor generator MG from a resolver 13, and input of a motor generator torque setpoint and others from integrated controller 10, and create based on the input information a control signal for controlling a motor generator operating point of motor generator MG which is defined by motor generator speed Nm and motor generator torque Tm, and output the control signal to inverter 3. Motor generator controller 2 is configured to monitor the SOC of battery 4 to which reference is made for control of motor generator MG, and provide same to integrated controller 10 through CAN communication line 11.

First clutch controller 5 is configured to receive input of information about the clutch hydraulic pressure and stroke position of first clutch CL1 from a first clutch hydraulic pressure sensor 14 and a first clutch stroke sensor 15, and input of a first clutch control setpoint of the clutch hydraulic pressure of first clutch CL1 from integrated controller 10, and create based on the input information a control signal for controlling the engagement/disengagement of first clutch CL1, and output the control signal to first clutch hydraulic unit 6. The information about first clutch stroke C1S is provided to integrated controller 10 through CAN communication line 11.

AT controller 7 is configured to receive input of information about the opening of an accelerator pedal, the travel speed of hybrid electric vehicle 51, and the clutch hydraulic pressure of second clutch CL2 from accelerator opening sensor 16, vehicle speed sensor 17, and second clutch hydraulic pressure sensor 18, and input of sensor information from an inhibitor switch that is configured to output a signal indicating the position of a shift lever operated by a driver. AT controller 7 is further configured to receive input of second clutch control setpoint P2* of the clutch hydraulic pressure P2 of second clutch CL2 from integrated controller 10, and create based on the input information a control signal for controlling the engagement/disengagement of second clutch CL2, and output the control signal to second clutch hydraulic unit 8 in the automatic transmission hydraulic pressure control valve unit. The information about accelerator pedal opening APO, vehicle speed VSP, and the inhibitor switch position is provided to integrated controller 10 through CAN communication line 11.

Brake controller 9 is configured to receive input of sensor information from a wheel speed sensor 19 for measuring the wheel speed of each wheel, and a brake stroke sensor 20, and control braking operation. For example, when the brake pedal is depressed and a driver's requested braking torque estimated from brake stroke BS is beyond a maximum possible regenerative braking torque, brake controller 9 performs a cooperative regenerative braking control based on a cooperative regenerative braking control signal from integrated controller 10 for satisfying the shortage of braking torque with a mechanical braking torque (braking torque by frictional braking). Also in response to braking requests other than such driver's requests, brake controller 9 can produce a braking torque arbitrarily based on mechanical braking and regenerative braking.

Integrated controller 10 is configured to monitor and manage entire consumed energy of hybrid electric vehicle 51, and function to allow hybrid electric vehicle 51 to travel at an optimized efficiency. Specifically, integrated controller 10 is configured to receive input of information from a motor generator speed sensor 21 for measuring motor generator speed Nm, a second clutch output speed sensor 22 for measuring second clutch output speed N2out that is the output speed of second clutch CL2, a second clutch torque sensor 23 for measuring second clutch transmitted torque capacity TCL2 that is the transmitted torque capacity of second clutch CL2, a brake hydraulic pressure sensor 24, a temperature sensor 10a for measuring the temperature of second clutch CL2, and an acceleration sensor (G sensor) 10b for measuring the longitudinal acceleration of hybrid electric vehicle 51, and input of information obtained through CAN communication line 11.

Integrated controller 10 is configured to control the operation of engine E by outputting a control command or signal to engine controller 1, and control the operation of motor generator MG by outputting a control command or signal to motor generator controller 2, and control the engagement/disengagement of first clutch CL1 by outputting a control command or signal to first clutch controller 5, and control the engagement/disengagement of second clutch CL2 by outputting a control command or signal to AT controller 7.

Integrated controller 10 includes a gradient load equivalent torque calculation section 600, and a second clutch protective control section 700. Gradient load equivalent torque calculation section 600 is configured to calculate an estimated road gradient of a road on which hybrid electric vehicle 51 is traveling or stationary, and calculate based on the estimated road gradient a gradient load equivalent torque which is applied to the wheels due to the gradient of the road. Second clutch protective control section 700 is configured to generate brake hydraulic pressure independently of brake pedal operation when a predetermined condition is satisfied.

The gradient load equivalent torque is a value of torque applied to the wheels when gravity acts on the vehicle along the road gradient in a backward direction when the vehicle is climbing on an ascending slope. The mechanical brake which applies a mechanical braking torque to each wheel is implemented by pressing a brake pad on brake rotor 901 by caliper 902. When hybrid electric vehicle 51 is subject to a backward force due to gravity, the generated braking torque is in the direction to push hybrid electric vehicle 51 forward. This braking torque in this direction is defined as a gradient load equivalent torque. The gradient load equivalent torque can be determined based on the road gradient and the inertia of the vehicle. Gradient load equivalent torque calculation section 600 of integrated controller 10 is configured to calculate the gradient load equivalent torque based on information about the weight and other specifications of hybrid electric vehicle 51, wherein the information is stored in a memory section. The gradient load equivalent torque may be set without any correction or may be obtained by addition or subtraction of a predetermined adjustment.

Second clutch protective control section 700 is configured to calculate a minimum value of braking torque required to prevent the vehicle from moving in the backward direction (called roll back) when the vehicle is stationary on an ascending slope. The required minimum value of braking torque is greater than or equal to the gradient load torque described above. When a predetermined condition is satisfied where the road gradient is greater than or equal to a predetermined threshold value when the vehicle is stationary, second clutch protective control section 700 outputs to brake controller 9 a control signal indicative of the calculated minimum required value as a lower limit of controlled braking torque. In the example, the minimum required braking torque is produced by distributing brake hydraulic pressure only to rear wheels RL, RR that are driving wheels. Alternatively, the minimum required braking torque may be produced by distributing brake hydraulic pressure only to front wheels FL, FR, or by distributing brake hydraulic pressure to all of the front and rear wheels in account of a distribution ratio between front and rear wheels. On the other hand, when the condition that the road gradient is greater than or equal to the predetermined threshold value when the vehicle is stationary is unsatisfied, second clutch protective control section 700 outputs a control signal such that braking torque gradually decreases. Second clutch protective control section 700 is further configured to output to AT controller 7 a request to prevent the AT controller 7 from outputting a control signal to second clutch CL2 for controlling the second clutch transmitted torque capacity TCL2, when a predetermined condition is satisfied.

Figure 2:
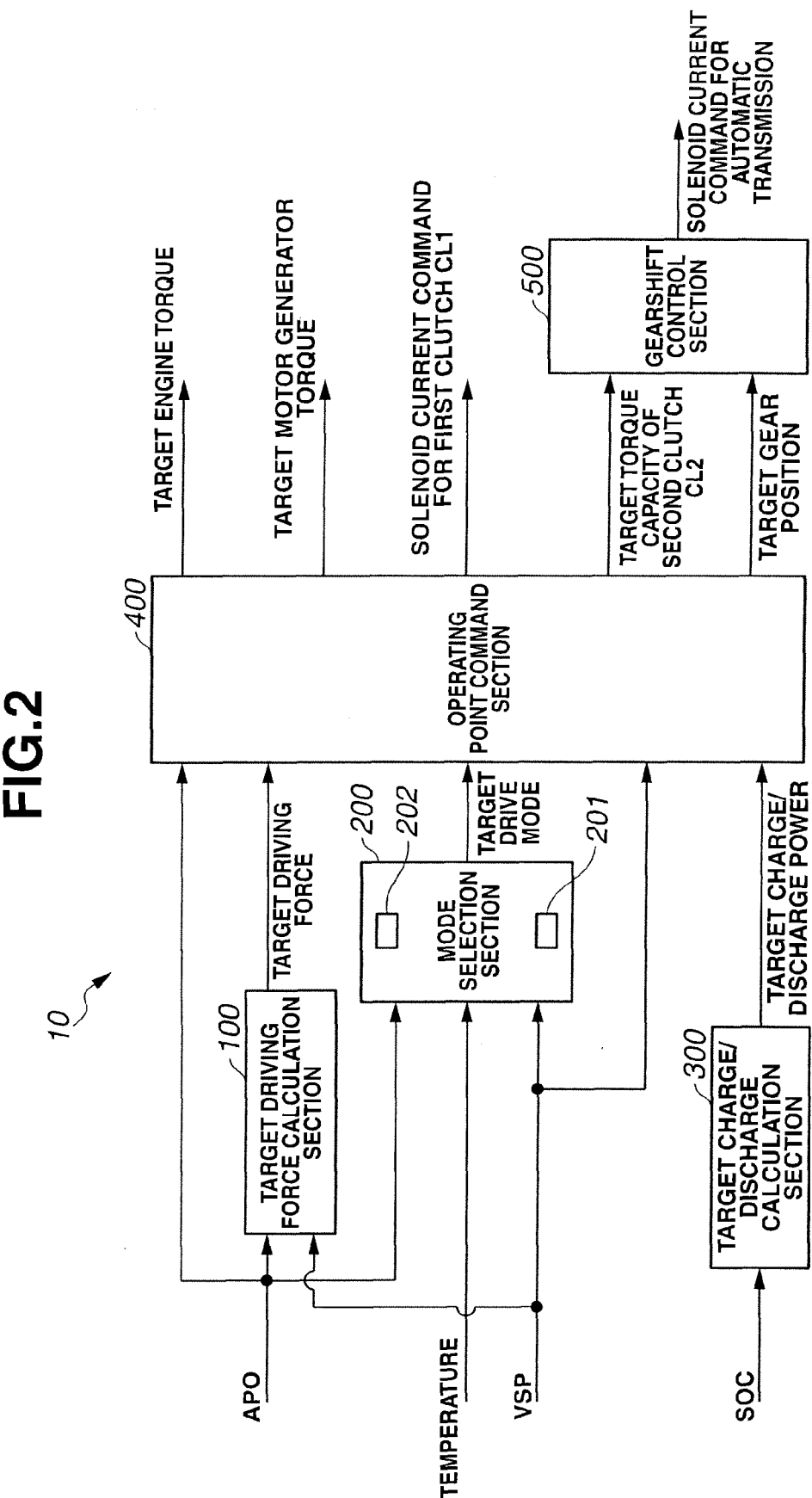
FIG. 2 is a control block diagram showing a computer program executed by an integrated controller of the vehicle control apparatus.

The following describes system configuration of integrated controller 10 for carrying out a series of various operations of calculation with reference to FIG. 2. Each series of calculation is performed at intervals of a predetermined control cycle such as 10 millisecond. Integrated controller 10 includes a target driving force calculation section 100, a mode selection section 200, a target charge/discharge calculation section 300, an operating point command section 400, and a gearshift control section 500.

Figure 3:
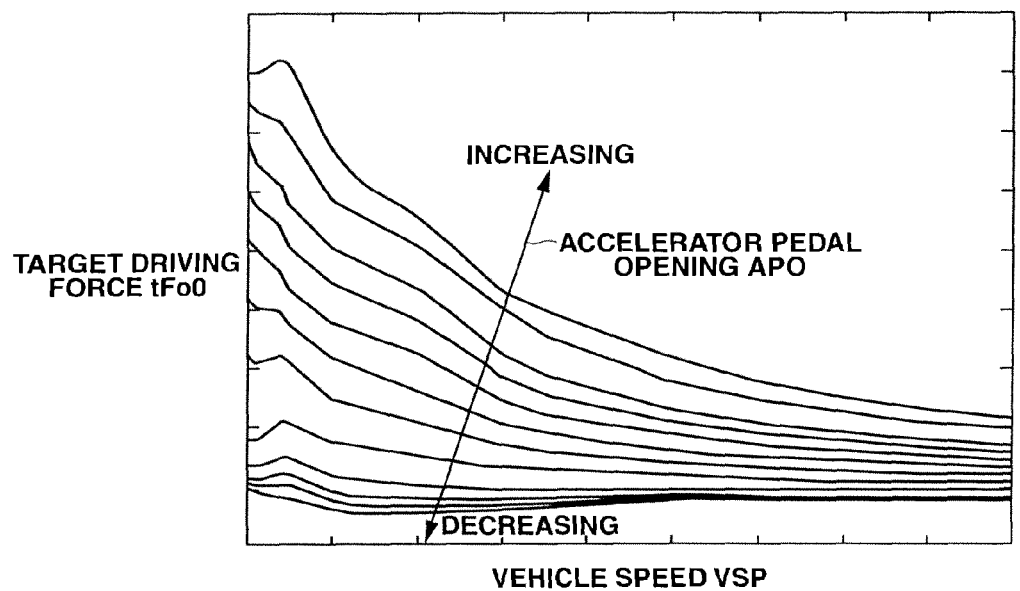
FIG. 3 is a graph showing an example of a map for calculating a target driving force, to which reference is made by a target driving force calculation section of the integrated controller.

Target driving force calculation section 100 is configured to calculate a target driving force tFo0 (or driver's requested driving torque) based on accelerator pedal opening APO and vehicle speed VSP by using a target driving force map as shown in FIG. 3.

Mode selection section 200 includes an estimated road gradient calculation section 201 and a mode selection map selection section 202. Estimated road gradient calculation section 201 is configured to calculate an estimated road gradient based on a measured value of the longitudinal acceleration of hybrid electric vehicle 51 obtained by acceleration sensor 10b. Specifically, estimated road gradient calculation section 201 is configured to calculate an actual vehicle acceleration based on the average of wheel accelerations measured by wheel speed sensor 19, and calculate the estimated road gradient based on the difference between the actual vehicle acceleration calculated based on wheel acceleration and the measured value obtained by acceleration sensor 10b.

Figure 4:
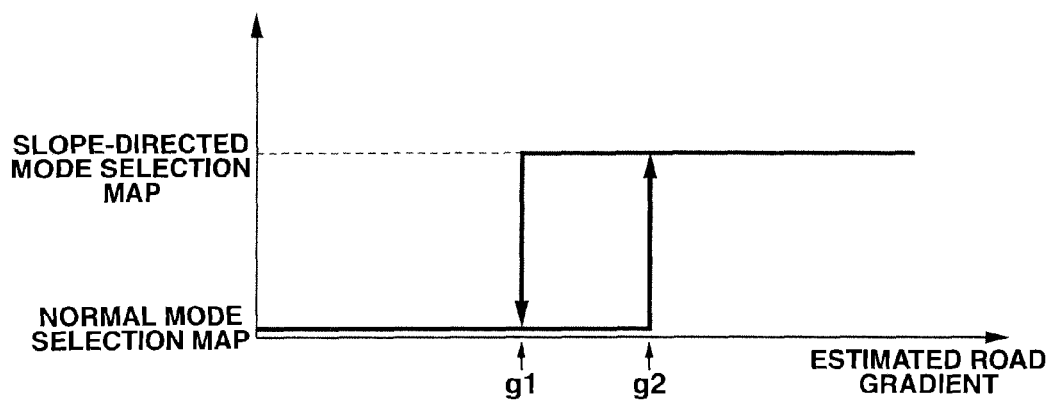
FIG. 4 is a graph showing a logic for selecting one of two mode selection maps based on an estimated road gradient, by which mode selection is made by a mode selection section of the integrated controller.

Mode selection map selection section 202 is configured to select one of two mode selection maps based on the estimated road gradient. FIG. 4 schematically shows a logic of selection by mode selection map selection section 202. When the estimated road gradient exceeds a second reference value g2 under condition that a normal mode selection map is being selected, mode selection map selection section 202 shifts from the normal mode selection map to a slope-directed mode selection map. On the other hand, when the estimated road gradient falls below a first reference value g1 (less than second reference value g2) under condition that the slope-directed mode selection map is being selected, mode selection map selection section 202 shifts from the slope-directed mode selection map to the normal mode selection map. The difference between first reference value g1 and second reference value g2 provides a hysteresis to prevent control hunching which may occur between the slope-directed mode selection map and the normal mode selection map.

Figure 5:
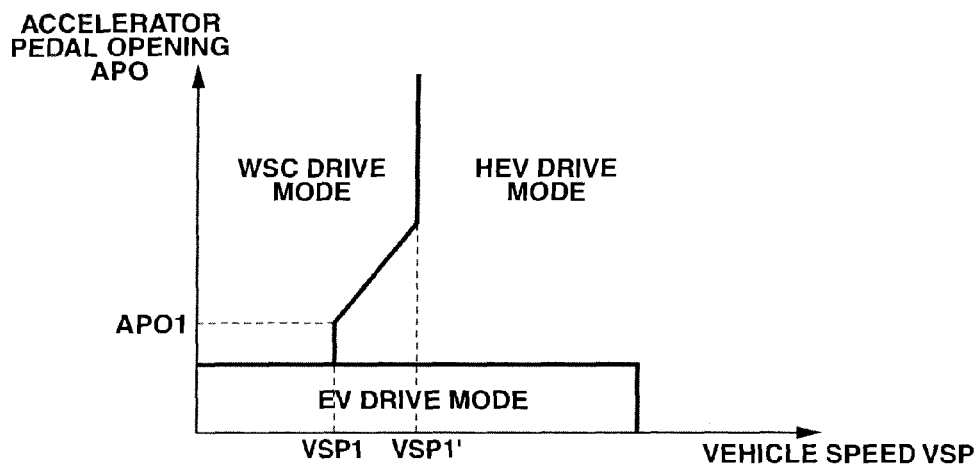
FIG. 5 is a graph showing a normal mode selection map for selecting one of drive modes as a target drive mode, to which reference is made by the mode selection section of the integrated controller.
Figure 6:
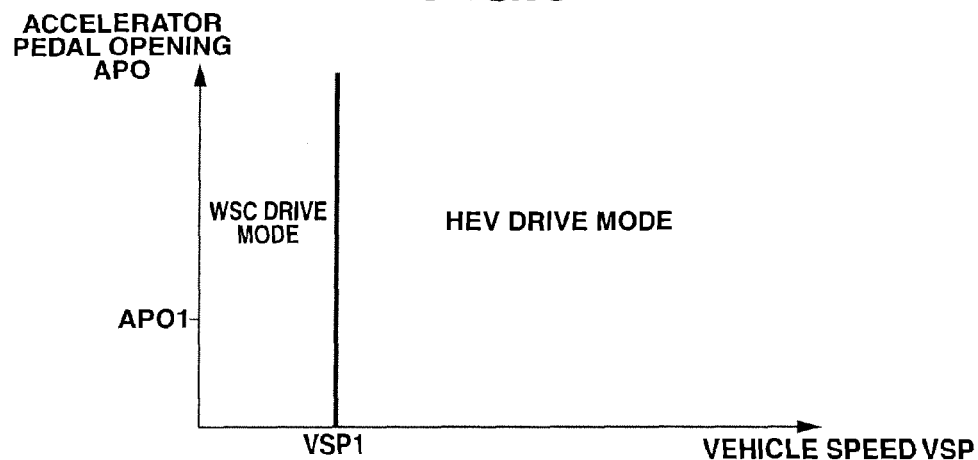
FIG. 6 is a graph showing a slope-directed mode selection map for selecting one of drive modes as a target drive mode, to which reference is made by the mode selection section of the integrated controller.

FIG. 5 shows the normal mode selection map, whereas FIG. 6 shows the slope-directed mode selection map. The normal mode selection map of FIG. 5 includes three areas, i.e. an area directed to the EV drive mode, an area directed to the WSC drive mode, and an area directed to the HEV drive mode. One of these drive modes is selected based on accelerator pedal opening APO and vehicle speed VSP. When the SOC of battery 4 is lower than or equal to a predetermined level, one of the HEV drive mode and the WSC drive mode is selected even when the combination of accelerator pedal opening APO and vehicle speed VSP indicates the selection of the EV drive mode.

In the normal mode selection map of FIG. 5, where accelerator pedal opening APO is less than an accelerator opening reference value APO1, the shift line or boundary line between the HEV drive mode and the WSC drive mode is defined at a vehicle speed lower limit VSP1 below which the rotational speed of engine E is below an idle speed. Where accelerator pedal opening APO is greater than accelerator opening reference value APO1, the area of the WSC drive mode extends to a second vehicle speed lower limit VSP1' greater than vehicle speed lower limit VSP1, because accelerator pedal opening APO indicates a request for a large driving force. When it is inappropriate or impossible to employ the EV drive mode because the SOC of battery 4 is at a low level, the WSC drive mode is selected even at vehicle start or the like.

When accelerator pedal opening APO is large, it is possible that the corresponding request for large driving force cannot be satisfied by the motor generator torque and the engine torque when the engine speed is at or near the idle speed, because the upper limit of engine torque generally increase as the engine speed increases. Conversely, enhancement of the engine speed serves to output a larger driving torque, and thereby quickly accelerate hybrid electric vehicle 51, and thereby quickly complete the shift from the WSC drive mode to the HEV drive mode. This is implemented by the extension of the area of the WSC drive mode to vehicle speed lower limit VSP1' in the normal mode selection map of FIG. 5 in which the WSC drive mode is employed up to the vehicle speed lower limit VSP1' above the vehicle speed lower limit VSP1 where accelerator pedal opening APO is larger than accelerator opening reference value APO1.

The slope-directed mode selection map of FIG. 6 differs from the normal mode selection map of FIG. 5 in that no area directed to the EV drive mode is defined. In addition, in the slope-directed mode selection map of FIG. 6, the area of the WSC drive mode is defined only by vehicle speed lower limit VSP1 which is constant with respect to accelerator pedal opening APO.

Figure 7:
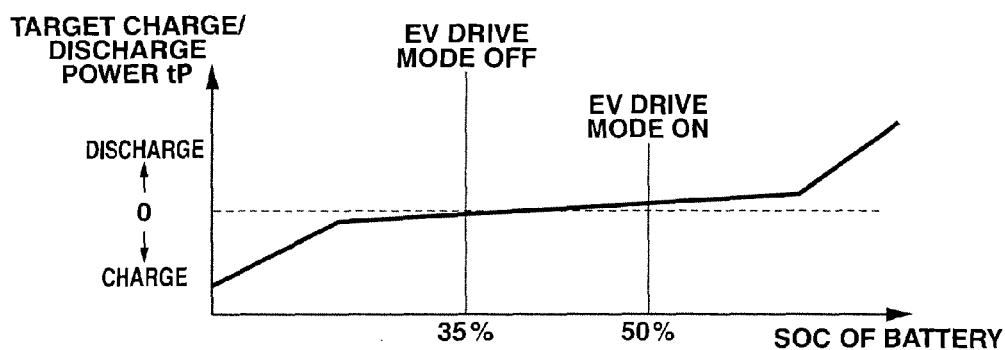
FIG. 7 is a graph showing an example of a map for calculating a target charge/discharge power, to which reference is made by a target charge/discharge calculation section of the integrated controller.

Target charge/discharge calculation section 300 is configured to calculate a target charge/discharge power tP based on the SOC of battery 4 by using a target charge/discharge map as shown in FIG. 7. In the target charge/discharge map, a line referred to as EV drive mode ON line and a line referred to as EV drive mode OFF line are defined. With reference to the EV drive mode ON line and the EV drive mode OFF line, the EV drive mode is permitted or inhibited. In this example, the EV drive mode ON line is defined by a condition that the SOC of battery 4 is equal to 50%, whereas the EV drive mode OFF line is defined by a condition that the SOC of battery 4 is equal to 35%. When the SOC of battery 4 is greater than or equal to 50%, the area of the EV drive mode appears in the normal mode selection map of FIG. 5. Once the area of the EV drive mode appears, it is maintained until the SOC of battery 4 becomes lower than 35%. When the SOC of battery 4 is lower than 35%, the area of the EV drive mode disappears in the normal mode selection map of FIG. 5. Once the area of the EV drive mode disappears, this condition is maintained until the SOC of battery 4 reaches 50%.

Operating point command section 400 is configured to calculate a target operating point based on accelerator pedal opening APO, target driving force tFo0 (or driver's requested driving torque), the selected target drive mode, vehicle speed VSP, and target charge/discharge power tP. The target operating point includes a target engine torque, a target motor generator torque, a target second clutch transmitted torque capacity TCL2\*, a target gear position of automatic transmission AT, and a solenoid current command or setpoint for first clutch CL1. Operating point command section 400 includes an engine starting control part for starting the engine E at transition from the EV drive mode to the HEV drive mode.

Gearshift control section 500 is configured to drive and control solenoid valves in automatic transmission AT so as to achieve the target second clutch transmitted torque capacity TCL2\* and the target gear position according to a shift schedule defined in a prepared shift map. The shift map defines a target gear position with respect to vehicle speed VSP and accelerator pedal opening APO.

<WSC Drive Mode> The WSC drive mode is characterized in that the operation of engine E is maintained active, which serves to quickly respond to changes in driver's requested driving torque. In the WSC drive mode, first clutch CL1 is engaged completely, and second clutch CL2 is slip-controlled so that slippage of second clutch CL2 is allowed and controlled, and both of engine E and motor generator MG are used to drive hybrid electric vehicle 51.

Hybrid electric vehicle 51 is provided with no device like a torque converter which serves to absorb differential rotation between two rotating elements. Accordingly, when first clutch CL1 and second clutch CL2 are completely engaged, vehicle speed VSP is determined directly by the rotational speed of engine E. The rotational speed of engine E is required to be above the lower limit or idle setpoint which enables to keep independent rotation of engine E with no external torque input. The idle setpoint depends on engine load, and is raised, for example, when engine E is being warmed up at idle. On the other hand, when the driver's requested driving torque is large, it may be impossible to quickly complete the shift to the HEV drive mode.

On the other hand, in the EV drive mode, first clutch CL1 is disengaged. Accordingly, the vehicle speed is not limited by the lower limit of the engine speed. However, when it is difficult to perform the EV drive mode because of the limitation based on the SOC of battery 4, or when the driver's requested driving torque is too large to be achieved only by motor generator MG, it is necessary to use engine E to generate a stable driving torque. In view of the foregoing, in situations where it is difficult or impossible to perform the EV drive mode or satisfy the driver's requested driving torque only with motor generator MG when vehicle speed VSP is lower than the value corresponding to the lower limit of the engine speed and, the WSC drive mode is performed in which the engine torque is used for driving the hybrid electric vehicle 51 by maintaining the engine speed at a predetermined lower limit setpoint, and slip-controlling the second clutch CL2.

Figure 8A:
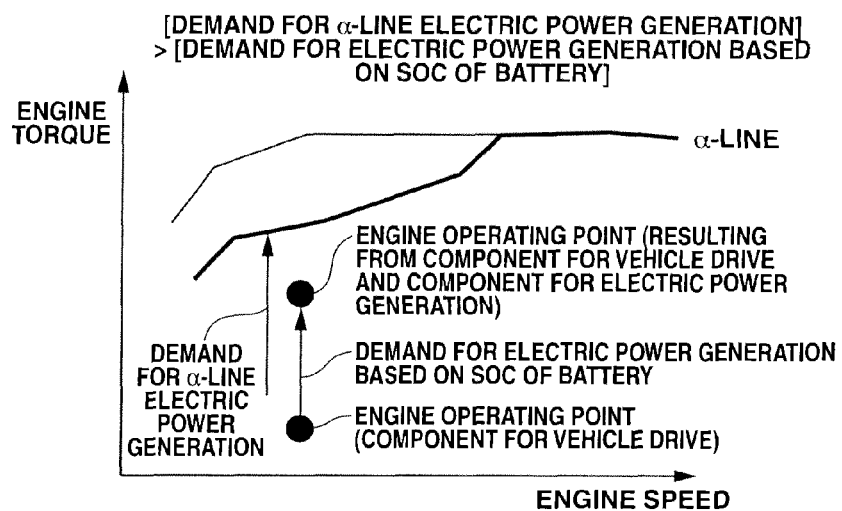
FIGS. 8A to 8C are a set of graphs showing how to set a target engine operating point in a WSC drive mode.
Figure 8B:
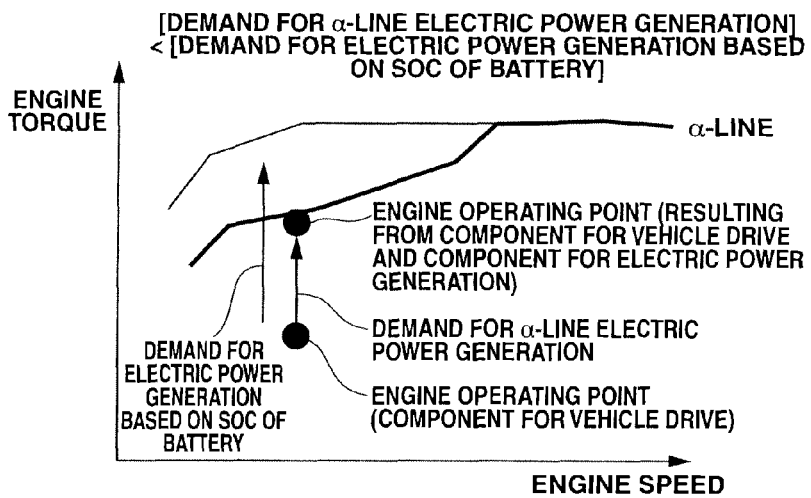
Figure 8C:
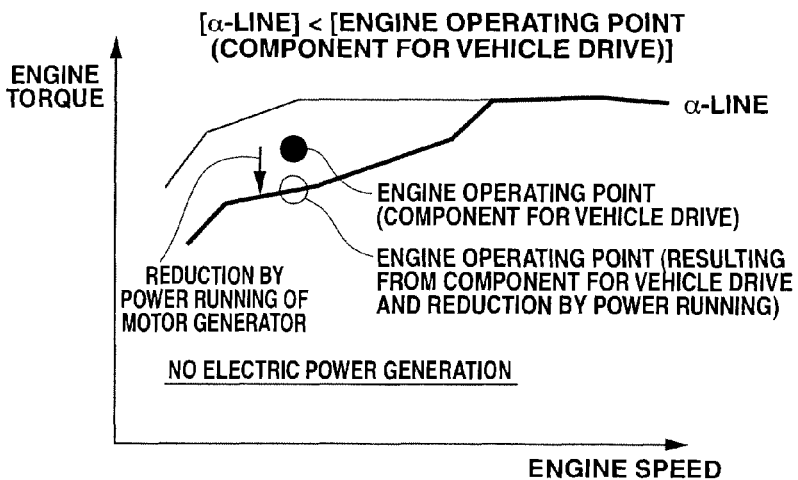
Figure 9:
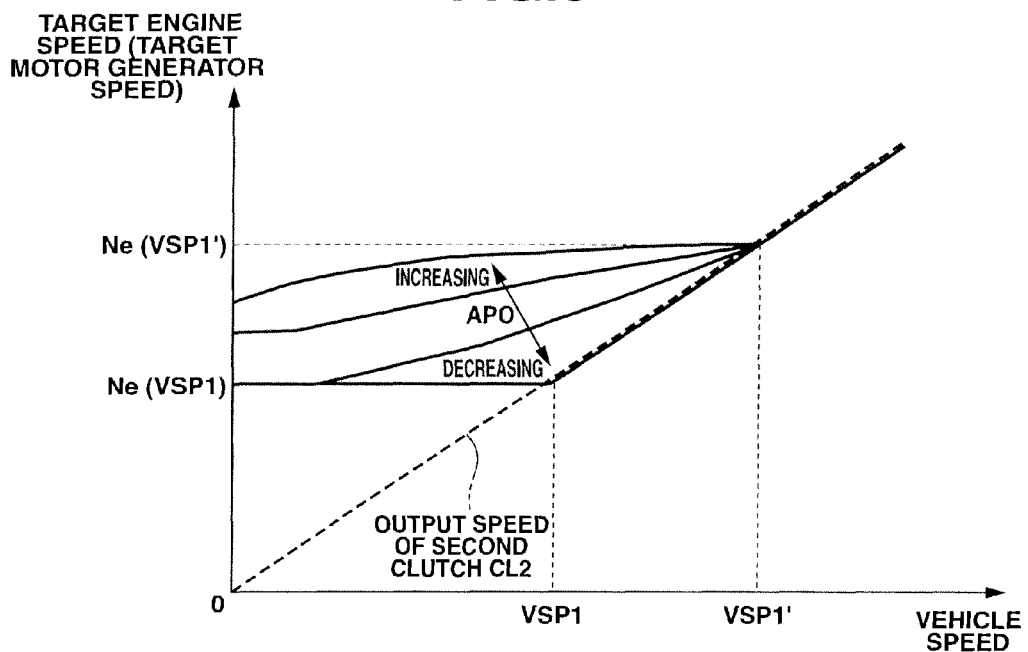
FIG. 9 is a graph showing a map for calculating a target engine speed in the WSC drive mode.

FIGS. 8A to 8C show how to set the target engine operating point in the WSC drive mode. FIG. 9 shows a map for calculating the target engine speed in the WSC drive mode. When the accelerator pedal is operated by a driver in the WSC drive mode, a target engine speed characteristic curve is selected based on accelerator pedal opening APO as shown in FIG. 9, and the target engine speed is determined based on vehicle speed VSP by using the selected characteristic curve. Then, the target engine torque is calculated based on the target engine speed through an engine operating point setting operation as shown in FIGS. 8A to 8C.

The operating point of engine E is a point defined by engine speed and engine torque. The engine operating point map of FIG. 8A, 8B or 8C shows an ideal curve (henceforth referred to as "α-line") which is created by connecting points at which engine E can operate at an optimized efficiency, and on which it is desired to operate engine E.

The method of setting the engine operating point according to the map of FIG. 9 does not always meet the α-line of the map of FIG. 8A, 8B or 8C, which depends on the driver's requested driving torque set by operation of the accelerator pedal. In order to conform the engine operating point to the α-line, the target engine torque is modified by feedforward control to a value derived in account of the α-line.

On the other hand, motor generator MG is controlled by rotational speed control so that the rotational speed of motor generator MG is controlled by feedback control to conform the engine speed to the target point. In situations where engine E and motor generator MG are coupled solidly to each other by engagement of first clutch CL1, control of conforming the rotational speed of motor generator MG to the target motor generator speed serves also to control the rotational speed of engine E to the target engine speed by feedback control. This control is referred to as motor generator ISC control. During the motor generator ISC control, the output torque of motor generator MG is automatically controlled to eliminate the difference between the driver's requested driving torque and the target engine torque derived in account of the α-line. In this way, motor generator MG is controlled with a basic controlled torque (regenerative running torque or power running torque) to eliminate the difference and additionally feedback-controlled to achieve the target engine speed.

In situations where the driver's requested driving torque is below the driving torque indicated by the α-line with the engine speed set at a certain value, the increase of engine output torque serves to enhance the engine output efficiency. Such an increase of engine output torque can be regenerated by motor generator MG with the input torque to second clutch CL2 conformed to the driver's requested driving torque. This serves to achieve efficient electric power generation. However, possible electric power generation depends on the SOC of battery 4, so that the enhancement of engine torque for electric power generation is limited to an upper limit. Accordingly, the demand for electric power generation based on the SOC of battery 4 (battery-SOC-requested generating power) is compared with the demand for electric power generation to the α-line (α-line generating power, namely, the difference between the torque component of the current operating point and the torque defined by the α-line).

FIG. 8A shows a situation where the α-line generating power is greater than the battery-SOC-requested generating power. In this situation, the engine output torque cannot be moved to the α-line, but can be increased by an amount within the battery-SOC-requested electric power for improving the efficiency.

FIG. 8B shows a situation where the α-line generating power is less than the battery-SOC-requested generating power. In this situation, the engine output torque can be moved to the α-line so that the engine operating point is maintained at the optimized point which achieves the highest fuel efficiency under the given condition.

FIG. 8C shows a situation where the basic engine operating point, namely the driver's requested engine operating point, is greater than the α-line. In this situation, unless the SOC of battery 4 is insufficient, the engine torque is lowered and the decrement of engine torque is covered by the power running of motor generator MG. This achieves the driver's requested driving torque while enhancing the fuel efficiency.

Figure 10:
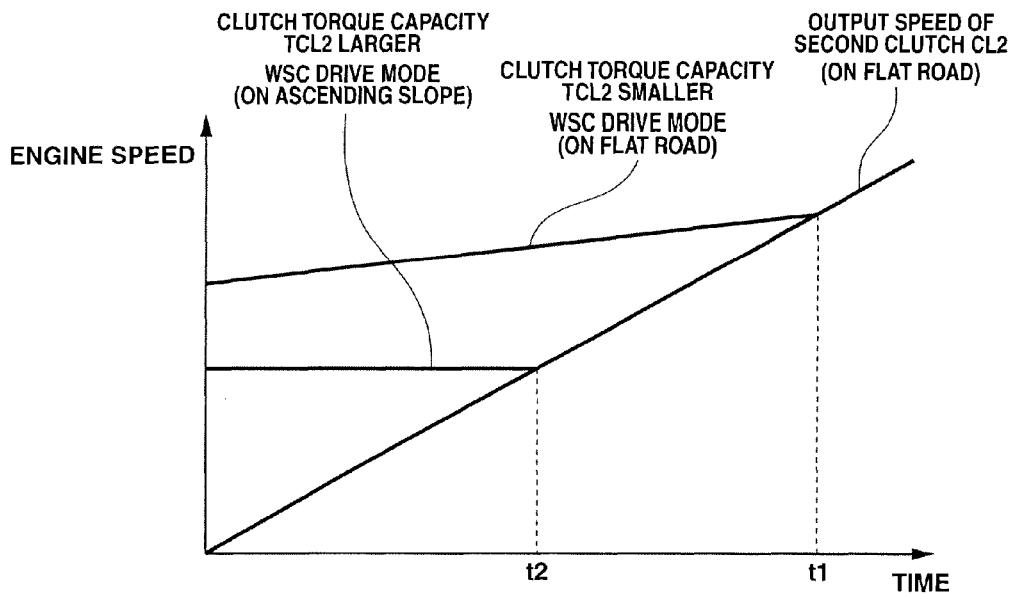
FIG. 10 is a time chart showing how engine speed changes when vehicle speed is controlled to increase at a controlled rate.

The following describes adjustment of the WSC drive mode depending on the estimated road gradient, namely, the difference between the normal mode selection map of FIG. 5 and the slope-directed mode selection map of FIG. 6. FIG. 10 shows how engine speed changes when vehicle speed is controlled to increase at a controlled rate. On a flat road, when accelerator pedal opening APO is greater than accelerator opening reference value APO1, the region of the WSC drive mode is extended so that the WSC drive mode is performed also above the vehicle speed lower limit VSP1. The increase of vehicle speed VSP is followed by a gradual increase of the target engine speed as shown in FIG. 9. When the vehicle speed VSP reaches vehicle speed lower limit VSP1', the slipping state of second clutch CL2 is canceled and engaged to enter the HEV drive mode.

On a slope whose estimated gradient is greater than a predetermined value (first reference value g1 or second reference value g2), the same increase of vehicle speed VSP described above is achieved by a large accelerator pedal opening APO depending on the gradient. Under this condition, the transmitted torque capacity TCL2 of second clutch CL2 is set greater than on flat roads. If the region of the WSC drive mode is extended as shown in FIG. 9 also under the slope condition, second clutch CL2 is maintained in slipping state in which engaging pressure is high. This may result in overheating of second clutch CL2. In order to avoid this problem, the slope-directed mode selection map of FIG. 6, which is selected when the estimated gradient is large, is not provided with the feature of extending the region of the WSC drive mode as in the normal mode selection map of FIG. 5. Namely, in the slope-directed mode selection map of FIG. 6, the WSC drive mode is limited to vehicle speed lower limit VSP1 that is constant with respect to accelerator pedal opening APO. This serves to prevent the overheating of second clutch CL2 in the WSC drive mode. Incidentally, when the rotational speed control about motor generator MG is difficult, for example, when the operation of motor generator MG is limited based on the SOC of battery 4, or when the controllability of motor generator MG is insufficient at extreme low temperature, an engine ISC control is performed in which the rotational speed is controlled by engine E.

<MWSC Drive Mode> The WSC drive mode includes an exceptional MWSC drive mode. In the MWSC drive mode, first clutch CL1 is disengaged but rotation of engine E is maintained, and the transmitted torque capacity TCL2 of second clutch CL2 is conformed to the driver's requested driving torque, and the rotational speed of motor generator MG is controlled to be higher by a controlled difference than the output rotational speed of second clutch CL2. The MWSC drive mode is provided for the following reasons.

When the estimated road gradient is greater than a predetermined value (first reference value g1 or second reference value g2), a larger driving torque is required in order to maintain the vehicle stationary or slightly moving forward without operation of the brake pedal than on flat roads. This is because it is necessary to resist the load of the weight of the vehicle due to gravity on slopes. In order to prevent second clutch CL2 from being overheated due to slipping, it is conceivable that the EV drive mode is selected when the SOC of battery 4 is sufficient. In such situations, when a shift from the EV drive mode to the WSC drive mode occurs, engine starting operation is necessary and carried out with part of the output torque of motor generator MG. This reduces available part of the output torque of motor generator MG for driving the vehicle, and thereby reduce the upper limit of the driving torque. Moreover, when the driving torque is contributed only by motor generator MG and the rotational speed of motor generator MG is set to zero or an extremely low level in the EV drive mode, it is possible that a lock current continues to flow through a specific switching element of the inverter, and thereby adversely affects the endurance of the switching element. Furthermore, when vehicle speed VSP is lower than a vehicle speed lower limit VSP2 that is smaller than vehicle speed lower limit VSP1 corresponding to the idle speed of engine E in first gear, the rotational speed of engine E cannot be maintained below the speed corresponding to vehicle speed VSP below vehicle speed lower limit VSP2. If the normal WSC drive mode is selected in that situation, it is possible that slippage of second clutch CL2 becomes large to adversely affect the endurance of second clutch CL2.

Especially on slopes, a larger braking force is requested than on flat roads, so that the transmitted torque capacity TCL2 of second clutch CL2 is requested to be sufficiently large. However, the combination of continued large transmitted toque and large slippage of second clutch CL2 tends to adversely affect the endurance of second clutch CL2. Moreover, on slopes, it takes more time to increase the vehicle speed, and thereby it takes more time to complete the transition to the HEV drive mode. This is disadvantageous in view of overheating of second clutch CL2. In order to solve the problems described above, the WSC drive mode is provided with the exceptional MWSC drive mode in which first clutch CL1 is disengaged but rotation of engine E is maintained, and the transmitted torque capacity TCL2 of second clutch CL2 is conformed to the driver's requested driving torque, and the rotational speed of motor generator MG is controlled to be higher by a controlled difference than the output rotational speed of second clutch CL2.

In other words, in the MWSC drive mode, the rotational speed of motor generator MG is set below the engine idle speed, and second clutch CL2 is slip-controlled. Simultaneously, engine E is controlled by feedback control to conform the engine speed to the idle setpoint. In the WSC drive mode, the rotational speed of engine E is maintained by feedback control of the rotational speed of motor generator MG. If this control condition is changed so that first clutch CL1 is disengaged, the engine speed cannot be controlled by control of motor generator MG. Accordingly, in the MWSC drive mode, engine E is controlled to operate independently of operation of motor generator MG.

The provision of the MWSC drive mode produces at least the following advantageous effects <i> to <iii>.

<i> The feature that engine E is in operation serves to eliminate the necessity of saving and generating a driving torque for cranking and starting the engine by motor generator MG, and thereby enhance the maximum possible effective driving torque of motor generator MG. Accordingly, the MWSC drive mode can satisfy a request for larger driving torque than the EV drive mode.

<ii> The feature of maintaining the rotation of motor generator MG serves to improve the endurance of the switching element and others.

<iii> The feature of making the motor generator MG rotate at lower speed than the engine idle speed serves to reduce the slippage of second clutch CL2, and thereby improve the endurance of second clutch CL2.

<Problem in WSC Drive Mode When Vehicle is Stationary> As described above, when hybrid electric vehicle 51 shifts into stationary state in response to depression of the brake pedal while the WSC drive mode is selected, then the transmitted torque capacity TCL2 of second clutch CL2 is set to a setpoint corresponding to creeping, and the rotational speed of motor generator MG is controlled at the idle speed of engine E that is coupled rigidly to motor generator MG in the WSC drive mode. At this moment, the rotational speed of each driving wheel is equal to zero because the vehicle is stationary. Accordingly, the slippage of second clutch CL2 is allowed and equal to the engine idle speed. If this condition continues for a long time, the endurance of second clutch CL2 may be adversely affected. In order to avoid this problem, it is desirable to disengage second clutch CL2 while the vehicle is maintained in stationary state by depression of the brake pedal.

The disengagement of second clutch CL2 in that situation may be confronted by the following problems. Second clutch CL2 is a wet type multiplate clutch in which a plurality of clutch plates are configured to be pressed on each other to set second clutch transmitted torque capacity TCL2. In view of reduction of dragging torque, the piston of second clutch CL2 is provided with a return spring so that only with low hydraulic pressure supplied, the piston is pulled back by the return spring. Once the piston is pulled back and is placed out of contact with the clutch plate, the transmitted torque capacity TCL2 of second clutch CL2 cannot be quickly established in response to resupply of hydraulic pressure. This may cause a time lag between a command for starting the vehicle and actual starting of the vehicle (or the resulting roll back) or a clutch engagement shock or the like, because the transmitted torque capacity TCL2 of second clutch CL2 is established with delay only after the piston is brought into contact to the clutch plate. Furthermore, even if supplied hydraulic pressure is suitably controlled to suitably set the transmitted torque capacity TCL2 of second clutch CL2 before a command of engagement, it is possible that optimal setting of second clutch transmitted torque capacity TCL2 is difficult or impossible due to influences of the temperature of hydraulic pressure, variations in manufacturing or the like.

In order to solve the problems described above, the vehicle control apparatus according to the present embodiment is configured to suitably set or correct the transmitted torque capacity TCL2 of second clutch CL2 when the vehicle is stationary, and thereby prevent such a time lag and an engagement shock.

Figure 11:
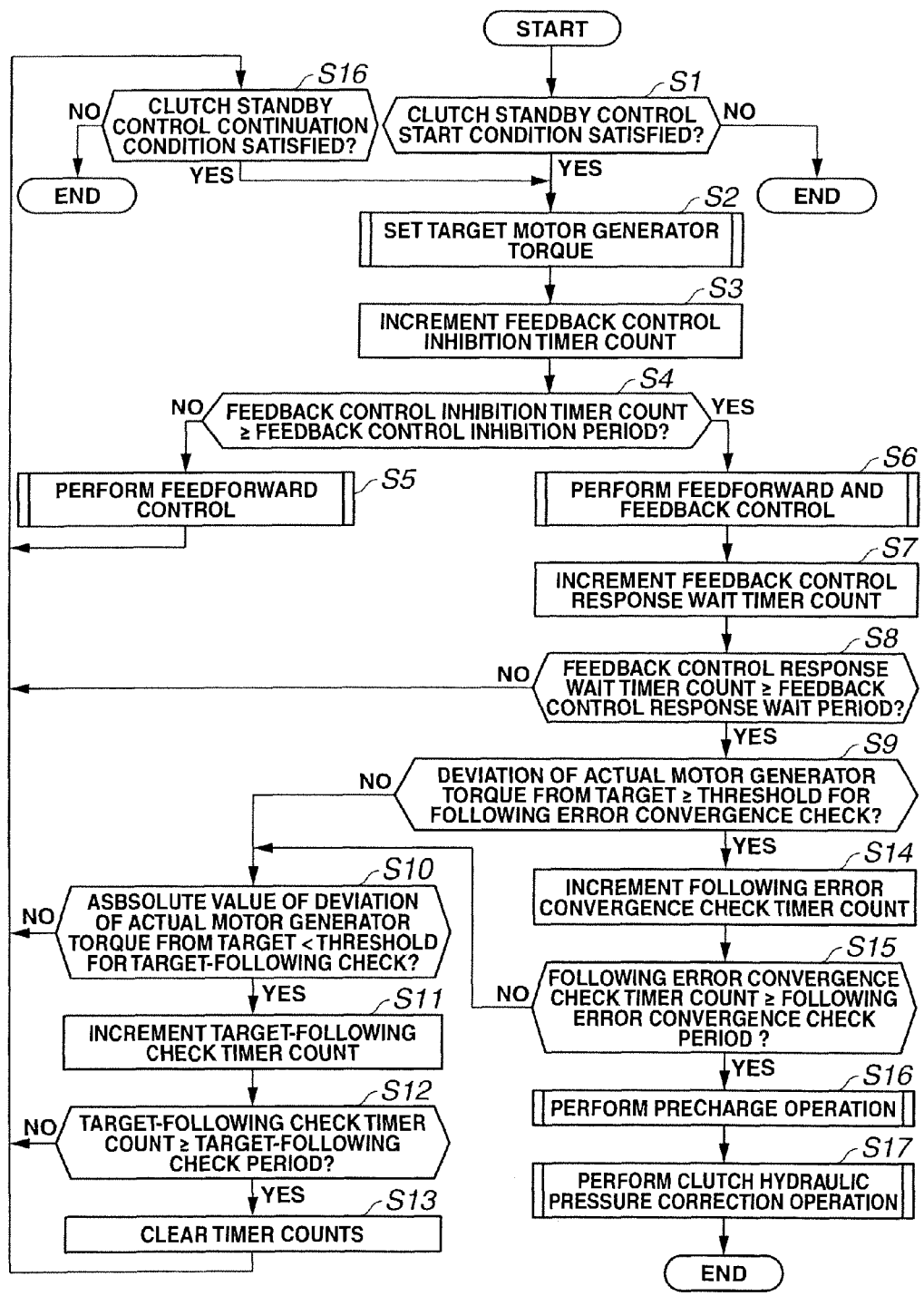
FIG. 11 is a flow chart showing a control procedure of transmitted torque capacity correction when the vehicle is stationary, which is performed by the integrated controller.

<Control of Clutch Transmitted Torque Capacity When Vehicle is Stationary> FIG. 11 is a flow chart showing a control procedure of clutch standby control, namely, transmitted torque capacity correction when the vehicle is stationary, which is performed by integrated controller 10. At Step S1, integrated controller 10 determines whether or not a precondition for starting the clutch standby control is satisfied. When the answer to Step S1 is affirmative (YES), then integrated controller 10 proceeds to Step S2. On the other hand, when the answer to Step S1 is negative (NO), then integrated controller 10 returns from this control procedure. The precondition is satisfied when the brake pedal is depressed, the accelerator pedal opening APO is substantially equal to zero, the vehicle speed VSP is substantially equal to zero, the WSC drive mode is selected, and the motor generator ISC control is active (i.e. the rotational speed control of motor generator MG is being performed, and the transmitted torque capacity TCL2 of second clutch CL2 is set equivalent to the creeping torque), or a flag is set for identifying the stationary condition of the vehicle by the other controllers and others.

The start of the clutch standby control is permitted after a predetermined period of time has elapsed after a transition to the WSC drive mode from the MWSC drive mode in which the engine system controls engine E independently by adjusting the intake air quantity and others and thereby maintaining the rotational speed of engine E with no external torque, or after a transition during the WSC drive mode from the engine ISC control, by which the rotational speed control of engine E is performed, to the motor generator ISC control, by which the rotational speed control of motor generator MG is performed to maintain the engine idle speed. This feature serves to take account of influences of rotational speed control of engine E in which ignition timing and intake air quantity are changed.

At Step S2, integrated controller 10 sets a target motor generator torque Tm*. The target motor generator torque Tm* is not a quantity on which the control of motor generator MG is based, but a quantity to which reference is made in this control procedure as follows. The rotational speed of motor generator MG is controlled by motor generator controller 2, wherein the setpoint of output torque of motor generator MG is set to maintain the engine idle speed. Accordingly, the actual motor generator torque Tm is determined by the load torque applied to motor generator MG. If the engine side load torque applied to motor generator MG is constant, the change of actual motor generator torque Tm can be regarded as a change in the transmitted torque capacity TCL2 of second clutch CL2. In view of the foregoing, target motor generator torque Tm* is set to an estimated value, which is to be reached by actual motor generator torque Tm due to change of the applied load, wherein the setting is based on an estimated change of the applied load due to a change of supplied hydraulic pressure of second clutch CL2. On the other hand, actual motor generator torque Tm is calculated based on information about the motor driving current and others from motor generator controller 2.

The setting of target motor generator torque Tm* is implemented by calculating a next value of target motor generator torque Tm* by reducing a current value of the target motor generator torque Tm* in a stepwise manner by a predetermined step reduction, in response to determination through Step S10 to S12 that actual motor generator torque Tm is following the target motor generator torque Tm*. When actual motor generator torque Tm is not following the target motor generator torque Tm*, the target motor generator torque Tm* is unchanged from the last value. The predetermined step reduction is set larger than a reduction for ramp control. The present control procedure is intended to establish a steady-state condition by timer management, and perform judgment based on the steady-state condition. If this step reduction is replaced with a series of small decrements, the judgment is delayed and identification and setting of optimized reduction is delayed. In this way, the present clutch standby control is configured to set a large step reduction in consideration that judgment is difficult under transient or unsteady state and setting of a large reduction allows quick judgment. The value of the control setpoint P2* of clutch hydraulic pressure P2 before reduction by stepwise reductions is referred to an initial point or value of the control setpoint in the clutch standby control.

At Step S3, integrated controller 10 increments a feedback control inhibition timer count. At Step S4, integrated controller 10 determines whether or not the feedback control inhibition timer count is greater than or equal to a predetermined feedback control inhibition period. When the answer to Step S4 is YES, then integrated controller 10 proceeds to Step S6. On the other hand, when the answer to Step S4 is NO, then integrated controller 10 proceeds to Step S5. By these operations, a component of the manipulated variable (i.e. the clutch hydraulic pressure control setpoint P2*) based on feedback control is prevented from being outputted, while the feedback control inhibition timer count is being incremented.

At Step S5, integrated controller 10 performs a feedforward control of reducing the control setpoint of hydraulic pressure supplied to second clutch CL2 in a stepwise manner, and then proceeds to Step S16. Namely, integrated controller 10 does not refer to the difference between the control setpoint P2* and the actual hydraulic pressure P2, but sets the control setpoint P2* to a constant value and output same regardless of the difference. The actual hydraulic pressure is determined by estimating based on the actual motor generator torque Tm.

At Step S6, integrated controller 10 sets the control setpoint P2* of clutch hydraulic pressure of second clutch CL2 by adding the feedback control component to the feedforward control component. Namely, when there is a difference between actual motor generator torque Tm and target motor generator torque Tm*, the component for compensating the difference is added. Specifically, when actual motor generator torque Tm is deviated from target motor generator torque Tm*, the control setpoint P2* is set further lower based on the deviation. The addition of the feedback control component is made because it is difficult to identify the factor for causing the difference between the control setpoint P2* and the actual hydraulic pressure P2. The factor may result from a condition that the response of the actual hydraulic pressure P2 to the control setpoint P2* is slow so that the target motor generator torque Tm* is not closely followed by the actual motor generator torque Tm, or may result from a condition that second clutch CL2 has been disengaged completely so that second clutch CL2 is shifted from a state in which the transmitted torque capacity TCL2 of second clutch CL2 is substantially equal to zero to a state in which the clutch piston moves further toward the disengagement side so that the target motor generator torque Tm* is not closely followed by the actual motor generator torque Tm.

At Step S7, integrated controller 10 increments a feedback control response wait timer count. At Step S8, integrated controller 10 determines whether or not the feedback control response wait timer count is greater than or equal to a predetermined feedback control response wait period. When the answer to Step S8 is YES, then integrated controller 10 proceeds to Step S9. On the other hand, when the answer to Step S8 is NO, then integrated controller 10 proceeds to Step S16. By these operations, the control setpoint P2* is set to a reduced value as long as there is a difference between the target motor generator torque Tm* and actual motor generator torque Tm, while the feedback control response wait timer count is being incremented.

At Step S9, integrated controller 10 determines whether or not the deviation of actual motor generator torque Tm from target motor generator torque Tm* is greater than or equal to a predetermined threshold value for following error convergence check. When the answer to Step S9 is YES, then integrated controller 10 proceeds to Step S14. On the other hand, when the answer to Step S9 is NO, then integrated controller 10 proceeds to Step S10. The predetermined threshold value for following error convergence check is a value that is determined in account of disturbances or errors or manufacturing variations, wherein the value indicates that the actual motor generator torque Tm has been conformed to the target motor generator torque Tm*.

At Step S10, integrated controller 10 determines whether or not the absolute value of the deviation of actual motor generator torque Tm from target motor generator torque Tm* is less than a predetermined threshold value for target-following check. When the answer to Step S10 is YES, then integrated controller 10 proceeds to Step S11. On the other hand, when the answer to Step S10 is NO, then integrated controller 10 proceeds to Step S16. At Step S11, integrated controller 10 increments a target-following check timer count. At Step S12, integrated controller 10 determines whether or not the target-following check timer count is greater than or equal to a predetermined target-following check period. When the answer to Step S12 is YES, then integrated controller 10 proceeds to Step S13. On the other hand, when the answer to Step S12 is NO, then integrated controller 10 proceeds to Step S16. If the transmitted torque capacity TCL2 of second clutch CL2 is equal to a non-zero value, the actual motor generator torque Tm decreases while following a reduction of the clutch hydraulic pressure control setpoint P2*. Conversely, if the actual motor generator torque Tm is within a range indicating that the actual motor generator torque Tm is following the target motor generator torque Tm* for a predetermined period of time, it indicates that the second clutch CL2 is not yet disengaged completely. At Step S13, integrated controller 10 clears each timer count. This operation is made for preparing for a next control cycle for reducing the clutch hydraulic pressure control setpoint P2* by a further step reduction.

At Step S14, integrated controller 10 increments a following error convergence check timer count. At Step S15, integrated controller 10 determines whether or not the following error convergence check timer count is greater than or equal to a predetermined following error convergence check period. When the answer to Step S15 is YES, then integrated controller 10 proceeds to Step S17. On the other hand, when the answer to Step S15 is NO, then integrated controller 10 proceeds to Step S10. If the load applied to motor generator MG falls in response to a reduction of the clutch hydraulic pressure control setpoint P2* by feedback control, the actual motor generator torque Tm is predicted to converge to the target motor generator torque Tm*. On the other hand, if second clutch CL2 is already disengaged, the actual motor generator torque Tm is predicted to fail to converge to the target motor generator torque Tm* by any reduction of the clutch hydraulic pressure control point. Conversely, the fact that the actual motor generator torque Tm does not converge to the target motor generator torque Tm* implies that second clutch CL2 has been disengaged completely. The value of the clutch hydraulic pressure control setpoint P2* at this timing when the answer to Step S15 is affirmative is referred to as a reference point or a final setpoint value.

At Step S16, integrated controller 10 determines whether or not a clutch standby control continuation condition is satisfied. When the answer to Step S16 is YES, then integrated controller 10 proceeds to Step S2 from which the clutch standby control is repeated and continued. On the other hand, when the answer to Step S16 is NO, then integrated controller 10 returns from this control procedure. The clutch standby control continuation condition is substantially equal to the clutch standby control start condition, wherein a hysteresis is provided for one or more parameters between these conditions, for preventing hunching therebetween.

When the shift from the motor generator ISC control to the engine ISC control occurs during the control procedure described above, the control procedure is interrupted and terminated immediately after the shift. This is because it is difficult to identify the factor for changing the actual motor generator torque Tm at that moment. Under that condition, it may be true that the shift causes the ignition timing and intake air quantity to be changed so that the engine load changes and thereby the motor generator torque Tm changes, or it may be true that the transmitted torque capacity TCL2 of second clutch CL2 changes due to the control procedure of clutch standby control and thereby the motor generator torque Tm changes.

Figure 12:
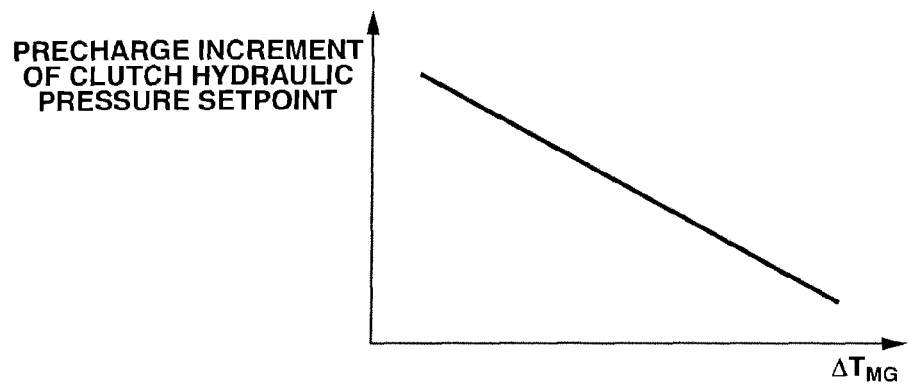
FIG. 12 is a graph showing a map for calculating a precharge increment of a clutch hydraulic pressure control setpoint, to which reference is made by the integrated controller during the control procedure.
Figure 13:
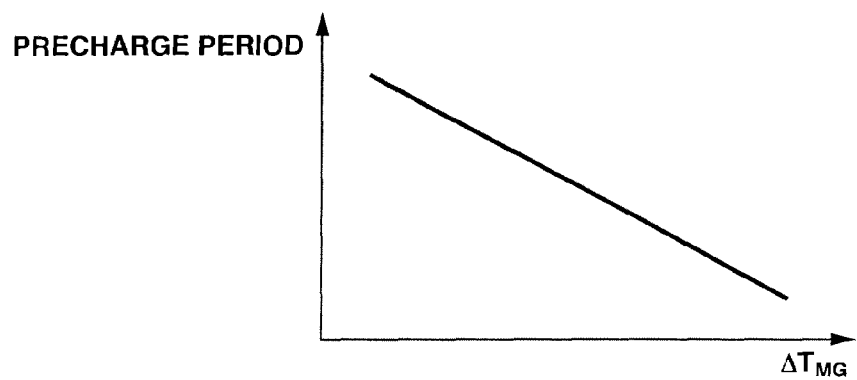
FIG. 13 is a graph showing a map for calculating a precharge period for the precharge increment, to which reference is made by the integrated controller during the control procedure.
Figure 14:
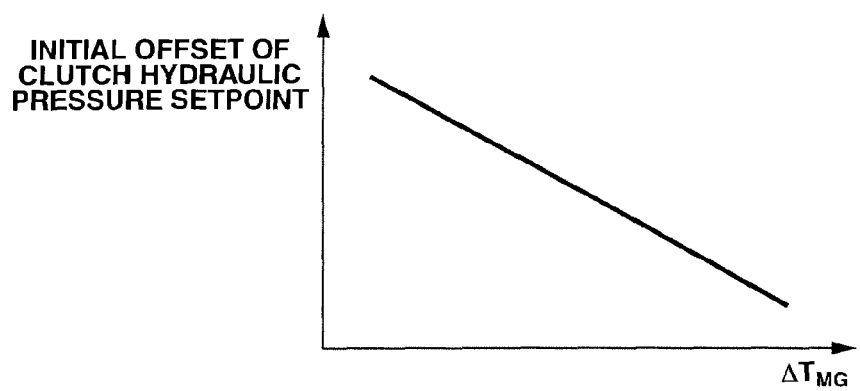
FIG. 14 is a graph showing a map for calculating an initial offset of the clutch hydraulic pressure control setpoint, to which reference is made by the integrated controller during the control procedure.

<Precharge Operation> At Step S17, integrated controller 10 performs a precharge operation. The precharge operation is eliminate a piston loss stroke of second clutch CL2 which occurs when the actual motor generator torque Tm fails to be conformed to the target motor generator torque Tm* even by sufficient reduction of the clutch hydraulic pressure control setpoint P2* (to the final setpoint value). FIG. 12 shows a map for calculating a precharge increment of the clutch hydraulic setpoint P2*, to which reference is made by integrated controller 10. FIG. 13 shows a map for calculating a precharge period for the precharge increment, to which reference is made by integrated controller 10. FIG. 14 shows a map for calculating an initial offset of the clutch hydraulic pressure control setpoint P2*, to which reference is made by integrated controller 10. The precharge is implemented by setting the clutch hydraulic pressure control setpoint P2* to a high value and outputting same during a predetermined period of time. Even with the clutch hydraulic pressure control setpoint P2* set to such a high value, the actual motor generator torque Tm fails to increase significantly, while the clutch piston of second clutch CL2 is traveling. The initial offset is added to the last minimum point of the clutch hydraulic pressure control setpoint P2*, to define a base point from which the clutch hydraulic pressure control setpoint P2* is increased at a preset torque recovering gradient, and actually outputted after the precharge operation.

The maps of FIGS. 12 to 14 have a motor generator torque change ΔTMG as a parameter which the calculation is based on. The motor generator torque change ΔTMG is a difference or decrement between a first value of the actual motor generator torque Tm and a second value of the actual motor generator torque Tm, wherein the actual motor generator torque Tm is equal to the first value when the following error convergence check timer count exceeds the following error convergence check period, and wherein the actual motor generator torque Tm is equal to the second value when it is determined before the last step reduction of the clutch hydraulic pressure control setpoint P2* that the actual motor generator torque Tm is following the target motor generator torque Tm*.

When the motor generator torque change ΔTMG is large, it indicates that the transmitted torque capacity TCL2 of second clutch CL2 is above zero even with major part of the last step reduction of the clutch hydraulic pressure control setpoint P2*, and then second clutch CL2 is disengaged completely with the remaining part of the last step reduction so that the transmitted torque capacity TCL2 of second clutch CL2 becomes substantially equal to zero. Accordingly, the condition that motor generator torque change ΔTMG is large indicates that the piston loss stroke of second clutch CL2 is small after second clutch CL2 is disengaged completely. On the other hand, when motor generator torque change ΔTMG is small, it indicates that the transmitted torque capacity TCL2 of second clutch CL2 becomes equal to zero with minor part of the last step reduction of the clutch hydraulic pressure control setpoint P2* so that the piston loss stroke of second clutch CL2 is large after second clutch CL2 is disengaged completely. The feedback control continued by timer management reduces the clutch hydraulic pressure control setpoint P2*, and also serves to increase the piston loss stroke of second clutch CL2. In view of the foregoing, the maps of FIGS. 12 to 14 are set based on motor generator torque change ΔTMG so that the precharge increment decreases, the precharge period decreases, and the initial offset decreases, as motor generator torque change ΔTMG increases.

After the precharge period has elapsed, the clutch hydraulic pressure control setpoint P2* is reduced by elimination of the precharge increment, and then starts to be increased again gradually at the preset torque recovering gradient so that the actual clutch hydraulic pressure gradually increases, until it is determined that the transmitted torque capacity TCL2 of second clutch CL2 starts to increase from zero. This determination is implemented by determining whether or not the actual motor generator torque Tm changes beyond a predetermined threshold change for torque recovery check. When determining that the transmitted torque capacity TCL2 of second clutch CL2 is above zero, integrated controller 10 proceeds to Step S18.

Figure 15:
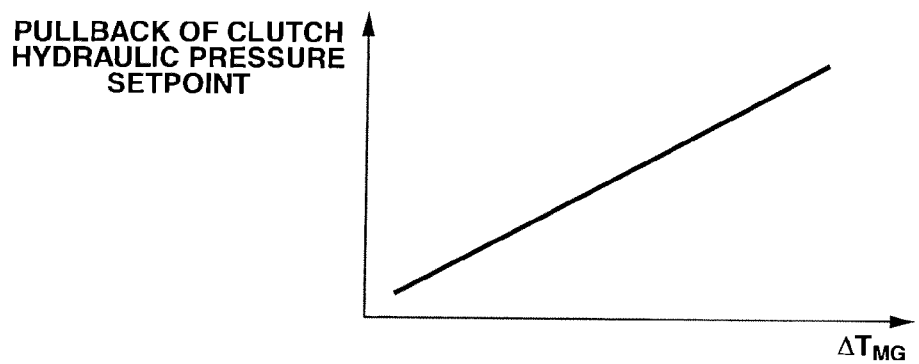
FIG. 15 is a graph showing a map for calculating a pullback of the clutch hydraulic pressure control setpoint, to which reference is made by the integrated controller during the control procedure.
Figure 16:
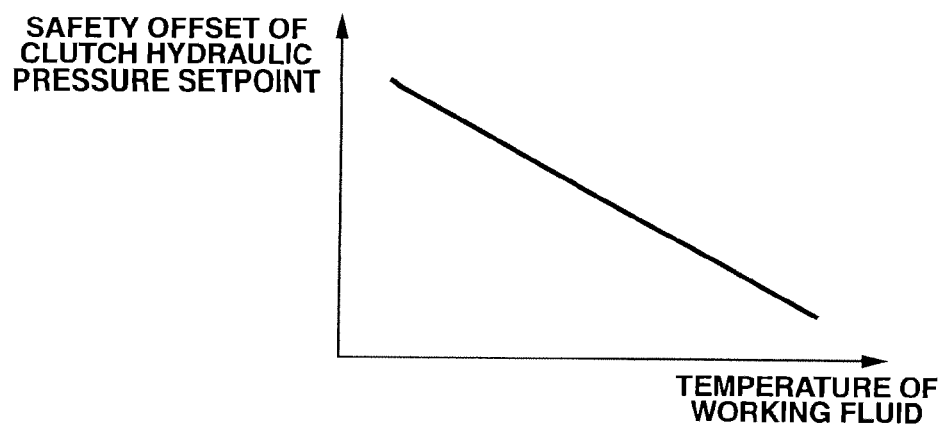
FIG. 16 is a graph showing a map for calculating a safety offset of the clutch hydraulic pressure control setpoint, to which reference is made by the integrated controller during the control procedure.

<Setting of Hydraulic Pressure to Corrected Setpoint> At Step S18, integrated controller 10 performs a clutch hydraulic pressure correction operation. The clutch hydraulic pressure correction operation is an operation for setting the clutch hydraulic pressure control setpoint P2* to a corrected point, by which the transmitted torque capacity TCL2 of second clutch CL2 is substantially equal to zero or slightly above zero. FIG. 15 shows a map for calculating a pullback of the clutch hydraulic pressure control setpoint P2*, to which reference is made by 10. FIG. 16 shows a map for calculating a safety offset of the clutch hydraulic pressure control setpoint P2*, to which reference is made by integrated controller 10.

The pullback is set based on motor generator torque change ΔTMG, and is subtracted from the previous control setpoint at the time it is determined that the actual motor generator torque Tm is following the target motor generator torque Tm*. As discussed above, the condition that motor generator torque change ΔTMG is large indicates that the previous control setpoint is too high with respect to the preferable neutral position of second clutch CL2. On the other hand, the condition that motor generator torque change ΔTMG is small indicates that the previous control setpoint is relatively close to the preferable neutral position of second clutch CL2. In view of the foregoing, the map of FIG. 15 is set so that the pullback of the clutch hydraulic pressure control setpoint P2* increases as the motor generator torque change ΔTMG increases.

The clutch hydraulic pressure control setpoint P2* corrected by the pullback is further corrected by addition of the safety offset, to obtain a final corrected control setpoint. The safety offset is set according to the temperature of working fluid so that the safety offset increases as the temperature decreases. When the temperature of working fluid is low, the viscosity of working fluid is high so as to adversely affect the hydraulic controllability of second clutch CL2. In order to ensure establishment of the transmitted torque capacity TCL2 of second clutch CL2, the safety offset is set to a large value under such conditions. On the other hand, when the temperature of working fluid is sufficiently high, the viscosity of working fluid is relatively low so as to maintain the hydraulic controllability of second clutch CL2. Under such conditions, the safety offset is set to a small value.

<How Clutch Standby Control Works> FIG. 17 shows an example of how the vehicle control apparatus according to the present embodiment operates the clutch standby control when the vehicle is stationary. Before a time instant t1, hybrid electric vehicle 51 is in an initial condition where the WSC drive mode is selected, the brake pedal is depressed, the accelerator pedal is released, hybrid electric vehicle 51 is stationary, and the motor generator ISC control is performed continuously. At time instant t1, it is determined that the clutch standby control start condition is satisfied. In response to this determination, the clutch hydraulic pressure control setpoint P2* is reduced by a step reduction, so that the target motor generator torque Tm* decreases in a stepwise manner. Simultaneously, the increment of the feedback control inhibition timer count is started. At a time instant t2, the feedback control inhibition timer count has reached the preset feedback control inhibition period. In response to this condition, the increment of the feedback control response wait timer count is started so that the feedback control component starts to be added to the control setpoint P2*. At this moment, the feedback control component is substantially equal to zero, because the deviation of the actual motor generator torque Tm from the target motor generator torque Tm* is substantially equal to zero.

At a time instant t3, the feedback control response wait timer count has reached the preset feedback control response wait period. In response to this condition, the increment of the target-following check timer count is started, because the deviation of the actual motor generator torque Tm from the target motor generator torque Tm* is small within the range indicating that actual motor generator torque Tm is following the target motor generator torque Tm*. At a time instant t4, the target-following check timer count has reached the preset target-following check period. In response to this condition, each timer count is reset based on determination that second clutch CL2 is still engaged and the transmitted torque capacity TCL2 of second clutch CL2 is maintained. Furthermore, the clutch hydraulic pressure control setpoint P2* is reduced by a further step reduction so that the target motor generator torque Tm* further decreases in a stepwise manner. Simultaneously, the increment of the feedback control inhibition timer count is started.

At a time instant t5, the feedback control inhibition timer count has reached the preset feedback control inhibition period. In response to this condition, the increment of the feedback control response wait timer count is started so that the feedback control component starts to be added to the control setpoint P2*. At this moment, the control setpoint P2* starts to gradually decrease with addition of the feedback control component, because the actual motor generator torque Tm has deviated from the target motor generator torque Tm*. In this situation, second clutch CL2 has been already disengaged completely. In response to the feedback control, the clutch piston of second clutch CL2 starts to move in the disengaging direction away from the position of contact with the clutch plate.

At a time instant t6, the feedback control response wait timer count has reached the preset feedback control response wait period. In response to this condition, the increment of the following error convergence check timer count is started, because the deviation of the actual motor generator torque Tm from the target motor generator torque Tm* is larger than the predetermined threshold value for following error convergence check.

At a time instant t7, the following error convergence check timer count has reached the preset feedback control response wait period. In response to this condition, the motor generator torque change ΔTMG is memorized and the precharge operation is started, because the deviation of the actual motor generator torque Tm from the target motor generator torque Tm* is still larger than the predetermined threshold value for following error convergence check as at time instant t6. The precharge operation is implemented by setting the precharge increment, precharge period, and initial offset by using the prepared maps, and bringing the clutch piston of second clutch CL2 back into a suitable stroke position.

At a time instant t8, the precharge period has elapsed. At this moment, the clutch hydraulic pressure control setpoint P2* is reduced first, and starts to be increased at the preset torque recovering gradient, so that the actual clutch hydraulic pressure gradually rises. This is followed by an increase of the transmitted torque capacity TCL2 of second clutch CL2 from zero, and by an increase of load torque applied to motor generator MG so that the actual motor generator torque Tm starts to increase.

At a time instant t9, the change or increase of the actual motor generator torque Tm exceeds the predetermined threshold change for torque recovery check. In response to this condition, the precharge operation is terminated, and the clutch hydraulic pressure correction operation is started. By the clutch hydraulic pressure correction operation, the clutch hydraulic pressure control setpoint P2* is set by subtracting the calculated pullback from the previous setpoint (when it is determined that the actual motor generator torque Tm is following the target motor generator torque Tm*), and adding the safety offset, so that the transmitted torque capacity TCL2 of second clutch CL2 is slightly established.

At a time instant t10, the brake pedal is released, and the accelerator pedal is depressed by a driver so that the target driving torque is set to rise. In response to this condition, the clutch hydraulic pressure control setpoint P2* is set to increase. At this moment, hybrid electric vehicle 51 can be started quickly and smoothly, because the piston loss stroke of second clutch CL2 is eliminated and second clutch CL2 is ready to increase the transmitted torque capacity TCL2 from the neutral point described above.

The hybrid electric vehicle provided with the vehicle control apparatus as described above produces at least the following advantageous effects <1> to <10>.

<1> A vehicle control apparatus includes: an engine (E) configured to output a torque (Te) for driving a vehicle (hybrid electric vehicle 51); an electric motor (motor generator MG) configured to output a torque (Tm) for driving the vehicle (51); a clutch (second clutch CL2 with second clutch hydraulic unit 8) including an electric motor side element (61) and a driving wheel side element (62), wherein the electric motor side element (61) is connected to the electric motor (MG) and the driving wheel side element (62) is connected to a driving wheel (left and right rear wheels RL, RR) of the vehicle (51), wherein the clutch (CL2, 8) is configured to set according to hydraulic pressure (P2) a transmitted torque capacity (TCL2) for torque transmission between the electric motor side element (61) and the driving wheel side element (62), and wherein the hydraulic pressure (P2) is regulated to a control setpoint (P2*); and a controller (integrated controller 10 with engine controller 1, motor generator controller 2 and AT controller 7) configured to set the control setpoint (P2*), wherein the controller (1, 2, 7, 10) is further configured to: implement an electric motor speed control drive mode (WSC drive mode with motor generator ISC control) by allowing slippage between the electric motor side element (61) and the driving wheel side element (62) of the clutch (CL2, 8) and controlling rotational speed (Nm) of the electric motor (MG) in a manner that the electric motor side element (61) of the clutch (CL2, 8) rotates faster by a controlled difference than the driving wheel side element (62) of the clutch (CL2, 8); implement an engine speed control drive mode (WSC drive mode with engine ISC control) by allowing the slippage of the clutch (CL2, 8) and controlling rotational speed (Ne) of the engine (E) in a manner that the electric motor side element (61) of the clutch (CL2, 8) rotates faster by a controlled difference than the driving wheel side element (62) of the clutch (CL2, 8); determine whether the vehicle (51) is stationary; perform a procedure (S1-S18) of reducing the control setpoint (P2*) in response to determination that the vehicle is stationary when the slippage of the clutch (CL2, 8) is being allowed and controlled; permit the procedure (S1-S18) when in the electric motor speed control drive mode (S1); and inhibit the procedure (S1-S18) when in the engine speed control drive mode (S1, S16). This feature serves to maintain the transmitted torque capacity TCL2 of second clutch CL2 small under the vehicle stationary condition in the WSC drive mode, and thereby prevent the clutch plates from being overheated or deteriorated, while serving to prevent this control from being adversely affected by fluctuations in the engine torque when in the engine speed control drive mode, and thereby achieve precise control of the transmitted torque capacity TCL2 of second clutch CL2.

<2> The vehicle control apparatus is further configured so that the controller (1, 2, 7, 10) is configured to: inhibit the procedure (S1-S18) until a predetermined period of time has elapsed after a mode shift from the engine speed control drive mode to the electric motor speed control drive mode; and permit the procedure (S1-S18) after the predetermined period of time has elapsed after the mode shift from the engine speed control drive mode to the electric motor speed control drive mode. This feature serves to achieve further precise control of the transmitted torque capacity TCL2 of second clutch CL2, while serving to eliminate the failure to suitably measure changes of actual motor generator torque Tm due to delay in response to changes of the ignition timing and intake air quantity made after the subject mode shift.

<3> The vehicle control apparatus is further configured so that the controller (1, 2, 7, 10) is configured to inhibit the procedure (S1-S18) immediately after a mode shift from the electric motor speed control drive mode to the engine speed control drive mode. This feature serves to achieve further precise control of the transmitted torque capacity TCL2 of second clutch CL2, while serving to eliminate incorrect operation which may result from incorrect identification of the factor for changing the actual motor generator torque Tm, because the subject mode shift means a mode shift of the engine from torque control to rotational speed control, and it may be true that the shift causes the ignition timing and intake air quantity to be changed so that the engine load changes and thereby the motor generator torque Tm changes, or it may be true that the transmitted torque capacity TCL2 of second clutch CL2 changes due to the control procedure of clutch standby control and thereby the motor generator torque Tm changes.

<4> The vehicle control apparatus is further configured so that the controller (1, 2, 7, 10) is configured to: obtain an actual value of the output torque (Tm) of the electric motor (MG); and implement the procedure (S1-S18) by: a first operation (S2, S5, S6) of reducing the control setpoint (P2*) from an initial point (t1); a second operation (S10-S12) of identifying a reference point (t5-t7) of the control setpoint (P2*), wherein with the control setpoint (P2*) set to the reference point (t5-t7), the actual value of the output torque (Tm) of the electric motor (MG) is substantially constant with respect to the reduction of the control setpoint (P2*); and a third operation (S17, S18) of setting the control setpoint (P2*) to a corrected point (t9) in response to the identification of the reference point (t5-t7), wherein the corrected point (t9) is lower than or substantially equal to the initial point (t1) and higher than the reference point (t5-t7). This feature serves to prevent the establishment of the transmitted torque capacity TCL2 of second clutch CL2 from being delayed at vehicle start, and also prevent the vehicle from being shocked by abrupt engagement of second clutch CL2 at vehicle start.

<5> The vehicle control apparatus is further configured so that the controller (1, 2, 7, 10) is configured to implement the first operation (S2, S5, S6) by reducing the control setpoint (P2*) from the initial point (t1) in a stepwise manner. This feature of stepwise reduction of the clutch hydraulic pressure serves to quickly produce a steady state change of the actual motor generator torque Tm, and quickly set the corrected hydraulic pressure setpoint, and thereby shorten the period when second clutch CL2 is uselessly slipped.

<6> The vehicle control apparatus is further configured so that the controller (1, 2, 7, 10) is configured to implement the first operation (S2, S5, S6) by: reducing the control setpoint (P2*) from the initial point (t1) in the stepwise manner; calculating a target point of the output torque (Tm*) of the electric motor (MG) based on the control setpoint (P2*); and reducing the control setpoint (P2*) based on a difference between the target point of the output torque (Tm*) of the electric motor (MG) and the actual value of the output torque (Tm) of the electric motor (MG) after determination that the actual value of the output torque (Tm) of the electric motor (MG) becomes substantially constant with respect to the stepwise reduction of the control setpoint (P2*). This feature serves to suitably identify the factor for the condition that the actual motor generator torque Tm is failing to follow the target motor generator torque Tm*, wherein the factor may be that reduction of the actual clutch hydraulic pressure is delayed or failed with respect to the reduction of the clutch hydraulic pressure control setpoint, or may be that second clutch CL2 is already disengaged completely. This allows to accurately correct the control setpoint.

<7> The vehicle control apparatus is further configured so that the controller (1, 2, 7, 10) is configured to implement the third operation (S17, S18) by: a first step (S17) of setting the control setpoint (P2*) to a precharge point (t7-t8) for a predetermined period of time (FIG. 13) in response to the identification of the reference point (t5-t7), wherein the precharge point (t7-t8) is higher than the initial point (t1); and a second step (S18) of setting the control setpoint (P2*) to the corrected point (t9) after the first step (S17). This feature serves to quickly eliminate the loss stroke of the clutch piston, and thereby quickly achieve the corrected control setpoint. This is effective, especially when the feedback control component has caused a relatively large loss stroke of the clutch piston.

<8> The vehicle control apparatus is further configured so that the third operation (S17, S18) includes: reducing the control setpoint (P2*) from the precharge point (t7-t8) after the first step (S17); and gradually increasing the control setpoint (P2*) before the second step (S18) after the reduction from the precharge point (t7-t8). This feature serves to suitably manage the piston stroke speed, and prevent rapid change of the transmitted torque capacity TCL2 of second clutch CL2 from the neutral point, and thereby prevent clutch engagement shocks.

<9> The vehicle control apparatus is further configured so that the controller (1, 2, 7, 10) is configured to set the corrected point (t9) of the control setpoint (P2*) based on a change (ΔTMG) of the actual value of the output torque (Tm) of the electric motor (MG) with respect to the reduction of the control setpoint (P2*) by the first operation (FIG. 15). This feature of setting the pullback of the control setpoint based on motor generator torque change ΔTMG serves to set the corrected control setpoint optimized.

<10> The vehicle control apparatus is further configured so that the controller (1, 2, 7, 10) is configured to set the corrected point (t9) of the control setpoint (P2*) in a manner that the corrected point (t9) increases as temperature of working fluid of the clutch (CL2, 8) decreases (FIG. 16). This feature of setting the safety offset based on the temperature of hydraulic pressure serves to properly set the transmitted torque capacity TCL2 of second clutch CL2.

The present embodiment may be modified in various manners. For example, the vehicle control apparatus may be adapted to any other type vehicle provided with a start clutch, although the present embodiment is adapted specifically to a hybrid electric vehicle. Although the vehicle control apparatus is adapted specifically to a front engine rear wheel drive vehicle, it may be adapted to a front engine front wheel drive vehicle. Although the vehicle control apparatus is configured to perform the clutch standby control of second clutch CL2 when the vehicle is stationary in the WSC drive mode, it may be configured to perform a similar control when the rotational speed of motor generator MG is being controlled with the clutch being slip-controlled.

The entire contents of Japanese Patent Application 2010-245718 filed Nov. 1, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle control apparatus comprising:
    an engine configured to output a torque for driving a vehicle;
    an electric motor configured to output a torque for driving the vehicle;
    a clutch including an electric motor side element and a driving wheel side element, wherein the electric motor side element is connected to the electric motor and the driving wheel side element is connected to a driving wheel of the vehicle, wherein the clutch is configured to set according to hydraulic pressure a transmitted torque capacity for torque transmission between the electric motor side element and the driving wheel side element, and wherein the hydraulic pressure is regulated to a control setpoint; and
    a controller configured to set the control setpoint, wherein the controller is further configured to:
        implement an electric motor speed control drive mode by allowing slippage between the electric motor side element and the driving wheel side element of the clutch and controlling rotational speed of the electric motor in a manner that the electric motor side element of the clutch rotates faster by a controlled difference than the driving wheel side element of the clutch;
        implement an engine speed control drive mode by allowing the slippage of the clutch and controlling rotational speed of the engine in a manner that the electric motor side element of the clutch rotates faster by a controlled difference than the driving wheel side element of the clutch;
        determine whether the vehicle is stationary;
        perform a procedure of reducing the control setpoint in response to determination that the vehicle is stationary when the slippage of the clutch is being allowed and controlled;
        permit the procedure when in the electric motor speed control drive mode; and
        inhibit the procedure when in the engine speed control drive mode.

2. The vehicle control apparatus as claimed in claim 1, wherein the controller is configured to:
    inhibit the procedure until a predetermined period of time has elapsed after a mode shift from the engine speed control drive mode to the electric motor speed control drive mode; and
    permit the procedure after the predetermined period of time has elapsed after the mode shift from the engine speed control drive mode to the electric motor speed control drive mode.

3. The vehicle control apparatus as claimed in claim 1, wherein the controller is configured to inhibit the procedure immediately after a mode shift from the electric motor speed control drive mode to the engine speed control drive mode.

4. The vehicle control apparatus as claimed in claim 1, wherein the controller is configured to:
    obtain an actual value of the output torque of the electric motor; and
    implement the procedure by:
        a first operation of reducing the control setpoint from an initial point;
        a second operation of identifying a reference point of the control setpoint, wherein with the control setpoint set to the reference point, the actual value of the output torque of the electric motor is substantially constant with respect to the reduction of the control setpoint; and a third operation of setting the control setpoint to a corrected point in response to the identification of the reference point, wherein the corrected point is lower than or substantially equal to the initial point and higher than the reference point.

5. The vehicle control apparatus as claimed in claim 4, wherein the controller is configured to implement the first operation by reducing the control setpoint from the initial point in a stepwise manner.

6. The vehicle control apparatus as claimed in claim 5, wherein the controller is configured to implement the first operation by:
  reducing the control setpoint from the initial point in the stepwise manner;
  calculating a target point of the output torque of the electric motor based on the control setpoint; and
  reducing the control setpoint based on a difference between the target point of the output torque of the electric motor and the actual value of the output torque of the electric motor after determination that the actual value of the output torque of the electric motor becomes substantially constant with respect to the stepwise reduction of the control setpoint.

7. The vehicle control apparatus as claimed in claim 4, wherein the controller is configured to implement the third operation by:
  a first step of setting the control setpoint to a precharge point for a predetermined period of time in response to the identification of the reference point, wherein the precharge point is higher than the initial point; and
  a second step of setting the control setpoint to the corrected point after the first step.

8. The vehicle control apparatus as claimed in claim 7, wherein the third operation includes:
  reducing the control setpoint from the precharge point after the first step; and
  gradually increasing the control setpoint before the second step after the reduction from the precharge point.

9. The vehicle control apparatus as claimed in claim 8, wherein the controller is configured to set the corrected point of the control setpoint based on a change of the actual value of the output torque of the electric motor with respect to the reduction of the control setpoint by the first operation.

10. The vehicle control apparatus as claimed in claim 4, wherein the controller is configured to set the corrected point of the control setpoint in a manner that the corrected point increases as temperature of working fluid of the clutch decreases.

11. A vehicle control method of controlling an object with a controller, wherein the object includes: an engine configured to output a torque for driving a vehicle; an electric motor configured to output a torque for driving the vehicle; and a clutch including an electric motor side element and a driving wheel side element, wherein the electric motor side element is connected to the electric motor and the driving wheel side element is connected to a driving wheel of the vehicle, wherein the clutch is configured to set according to hydraulic pressure a transmitted torque capacity for torque transmission between the electric motor side element and the driving wheel side element, and wherein the hydraulic pressure is regulated to a control setpoint, the vehicle control method comprising:
  implementing an electric motor speed control drive mode by allowing slippage between the electric motor side element and the driving wheel side element of the clutch and controlling rotational speed of the electric motor in a manner that the electric motor side element of the clutch rotates faster by a controlled difference than the driving wheel side element of the clutch;
  implementing an engine speed control drive mode by allowing the slippage of the clutch and controlling rotational speed of the engine in a manner that the electric motor side element of the clutch rotates faster by a controlled difference than the driving wheel side element of the clutch;
  determining whether the vehicle is stationary;
  performing a procedure of reducing the control setpoint in response to determination that the vehicle is stationary when the slippage of the clutch is being allowed and controlled;
  permitting the procedure when in the electric motor speed control drive mode; and
  inhibiting the procedure when in the engine speed control drive mode.

* * * * *